(12) United States Patent
Urabe et al.

(10) Patent No.: US 9,903,372 B2
(45) Date of Patent: Feb. 27, 2018

(54) PUMP, METHOD FOR MANUFACTURING PUMP, AND REFRIGERATION CYCLE DEVICE

(71) Applicants: Yuto Urabe, Tokyo (JP); Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP)

(72) Inventors: Yuto Urabe, Tokyo (JP); Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 513 days.

(21) Appl. No.: 14/418,127

(22) PCT Filed: Oct. 5, 2012

(86) PCT No.: PCT/JP2012/076004
§ 371 (c)(1),
(2) Date: Jan. 29, 2015

(87) PCT Pub. No.: WO2014/054175
PCT Pub. Date: Apr. 10, 2014

(65) Prior Publication Data
US 2015/0159656 A1 Jun. 11, 2015

(51) Int. Cl.
*H02K 1/27* (2006.01)
*H02K 1/04* (2006.01)
(Continued)

(52) U.S. Cl.
CPC ......... *F04D 13/064* (2013.01); *F04D 29/026* (2013.01); *F04D 29/2227* (2013.01);
(Continued)

(58) Field of Classification Search
CPC .......... H02K 1/27–1/2793; H02K 1/04; H02K 15/00–15/165
(Continued)

(56) References Cited

U.S. PATENT DOCUMENTS 5,682,072 A * 10/1997 Takahashi ............ H02K 1/2733
310/156.46
2002/0047329 A1* 4/2002 Sashino ............... H02K 1/2733
310/43

FOREIGN PATENT DOCUMENTS

JP 62-044055 A 2/1987
JP 62044055 A * 2/1987
(Continued)

OTHER PUBLICATIONS

Machine Translation, Kobayashi, JP 62044055 A, Feb. 1987.*
(Continued)

*Primary Examiner* — Thomas Truong
(74) *Attorney, Agent, or Firm* — Posz Law Group, PLC

(57) ABSTRACT

A pump is provided that includes a molded stator having a substrate on which is mounted a magnetic-pole position detection element and that also includes a rotor having a rotor unit with one end thereof in an axial direction being opposed to the magnetic-pole position detection element and the other end thereof in the axial direction being provided with an impeller attachment unit. The rotor unit includes a magnet, a sleeve bearing, and a resin portion formed from a thermoplastic resin that is used for integrally molding the magnet and the sleeve bearing and that constitutes the impeller attachment unit. The magnet includes a plurality of (Continued)

through holes that each extend in the axial direction; and each of the through holes is embedded in the thermoplastic resin that constitutes a part of the resin portion.

13 Claims, 15 Drawing Sheets

(51) Int. Cl.
| F04D 13/06 | (2006.01) |
| F04D 29/02 | (2006.01) |
| F04D 29/62 | (2006.01) |
| F04D 29/22 | (2006.01) |
| H02K 7/08 | (2006.01) |
| H02K 7/14 | (2006.01) |
| F24D 11/02 | (2006.01) |
| H02K 1/02 | (2006.01) |
| F25B 30/02 | (2006.01) |
| F25B 49/02 | (2006.01) |

(52) U.S. Cl.
CPC ........ *F04D 29/628* (2013.01); *F24D 11/0214* (2013.01); *H02K 1/02* (2013.01); *H02K 1/2733* (2013.01); *H02K 7/086* (2013.01); *H02K 7/14* (2013.01); *F05D 2300/43* (2013.01); *F25B 30/02* (2013.01); *F25B 49/022* (2013.01); *F25B 2339/047* (2013.01); *F25B 2600/0253* (2013.01); *F25B 2600/112* (2013.01); *F25B 2600/2513* (2013.01); *F25B 2700/1931* (2013.01); *F25B 2700/2106* (2013.01); *F25B 2700/21161* (2013.01); *Y02B 30/126* (2013.01); *Y02B 30/741* (2013.01); *Y02B 30/743* (2013.01)

(58) Field of Classification Search
USPC .................................. 310/43, 156.01–156.84
IPC .......................... H02K 1/27, 1/04, 15/00, 15/16
See application file for complete search history.

(56) References Cited

FOREIGN PATENT DOCUMENTS

| JP | H05-023784 U | 3/1993 |
| JP | H06-315245 A | 11/1994 |
| JP | H11-252837 A | 9/1999 |
| JP | 2005-323452 A | 11/2005 |
| JP | 2006-149200 A | 6/2006 |
| JP | 2009-197729 A | 9/2009 |
| JP | 2011-188701 A | 9/2011 |
| JP | 2011188701 A * | 9/2011 |
| JP | 2012-029460 A | 2/2012 |
| JP | 2012-057560 A | 3/2012 |
| JP | 2012-095375 A | 5/2012 |

OTHER PUBLICATIONS

Machine Translation, Aso, JP 2011188701 A, Sep. 2011.*
Office Action dated Sep. 8, 2015 in the corresponding JP application No. 2014-539561 (with English translation).
International Search Report of the International Searching Authority dated Dec. 25, 2012 for the corresponding international application No. PCT/JP2012/076004 (and English translation).
Office Action dated Apr. 20, 2016 in the corresponding CN application No. 201280075829.7 (with English translation).

* cited by examiner

PUMP, METHOD FOR MANUFACTURING PUMP, AND REFRIGERATION CYCLE DEVICE

CROSS REFERENCE TO RELATED APPLICATION

This application is a U.S. national stage application of PCT/JP2012/076004 filed on Oct. 5, 2012, the contents of which are incorporated herein by reference.

FIELD

The present invention relates to a pump, a method for manufacturing a pump, and a refrigeration cycle device.

BACKGROUND

A DC brushless motor has been proposed for use in a magnet motor pump. The magnet motor pump includes a rotor having a rotor magnet integrally provided in the impeller, a stator having a stator coil provided on an outer periphery side of the rotor, and a Hall element for detecting the magnetic poles of the rotor magnet arranged inside the stator (see, for example, Patent Literature 1).

CITATION LIST

Patent Literature

Patent Literature 1: Japanese Utility Model Laid-open Publication No. H05-23784

SUMMARY

Technical Problem

There is a problem however with the pump used with the magnet pump motor described in the above Patent Literature 1 in that, because the outer peripheral surface of the rotor magnet is covered with a thermoplastic resin, the distance between the stator and the rotor magnet is increased and thus the performance of the pump is possibly reduced.

The present invention has been achieved in view of the above problem, and an objective of the present invention is to provide a pump that can prevent magnets from cracking due to the thermal shock associated with a cold/hot water cycle without the outer peripheral surface of the magnet being covered with resin, to provide a method for manufacturing the pump, and to provide a refrigeration cycle device including the pump.

Solution to Problem

The present invention is made to solve the problem and achieve the objective mentioned above and is relates to a pump that includes: an annular molded stator having a substrate upon which is mounted a magnetic-pole position detection element; and a rotor having an annular rotor unit rotatably housed in a cup-shaped partition component, with one end thereof in an axial direction opposing the magnetic-pole position detection element and with the other end thereof in the axial direction being provided with an impeller attachment unit to which an impeller is attached. The rotor unit includes an annular magnet, a sleeve bearing provided inside of the magnet, and a resin portion formed from a thermoplastic resin from which an integral molding is made for the magnet and the sleeve bearing and that constitutes the impeller attachment unit, the magnet includes a plurality of through holes, each extending in the axial direction between an end face on a side of the magnetic-pole position detection element and an end face on a side of the impeller attachment unit, and each of the through holes is embedded in the thermoplastic resin that constitutes a part of the resin portion.

Advantageous Effects of Invention

According to the present invention, a plurality of through holes, each extending in an axial direction, is provided in a magnet that constitutes a rotor unit, and each of the through holes is embedded in a thermoplastic resin when they are integrally molded. Therefore, the magnet is firmly held by the thermoplastic resin and is prevented from cracking due to the thermal shock associated with a cold/hot water cycle without the outer peripheral surface of the magnet being covered with the resin.

BRIEF DESCRIPTION OF DRAWINGS

FIG. 15 is a view of the resin magnet 68 viewed from an opposite side to the side of the protrusion 68a.

FIG. 16 is a perspective view of the resin magnet 68 viewed from the side of the protrusion 68a.

FIG. 17 is a perspective view of the resin magnet 68 viewed from the opposite side to the side of the protrusion 68a.

DESCRIPTION OF EMBODIMENTS

Exemplary embodiments of a pump, a method for manufacturing a pump, and a refrigeration cycle device according to the present invention will be explained below in detail with reference to the accompanying drawings. The present invention is not limited to the embodiments.

First Embodiment

In the following descriptions, an outline of a heat-pump type water heater as an example of application of the pump according to the present embodiment is described first, and details of the pump are given next.

Figure 1:
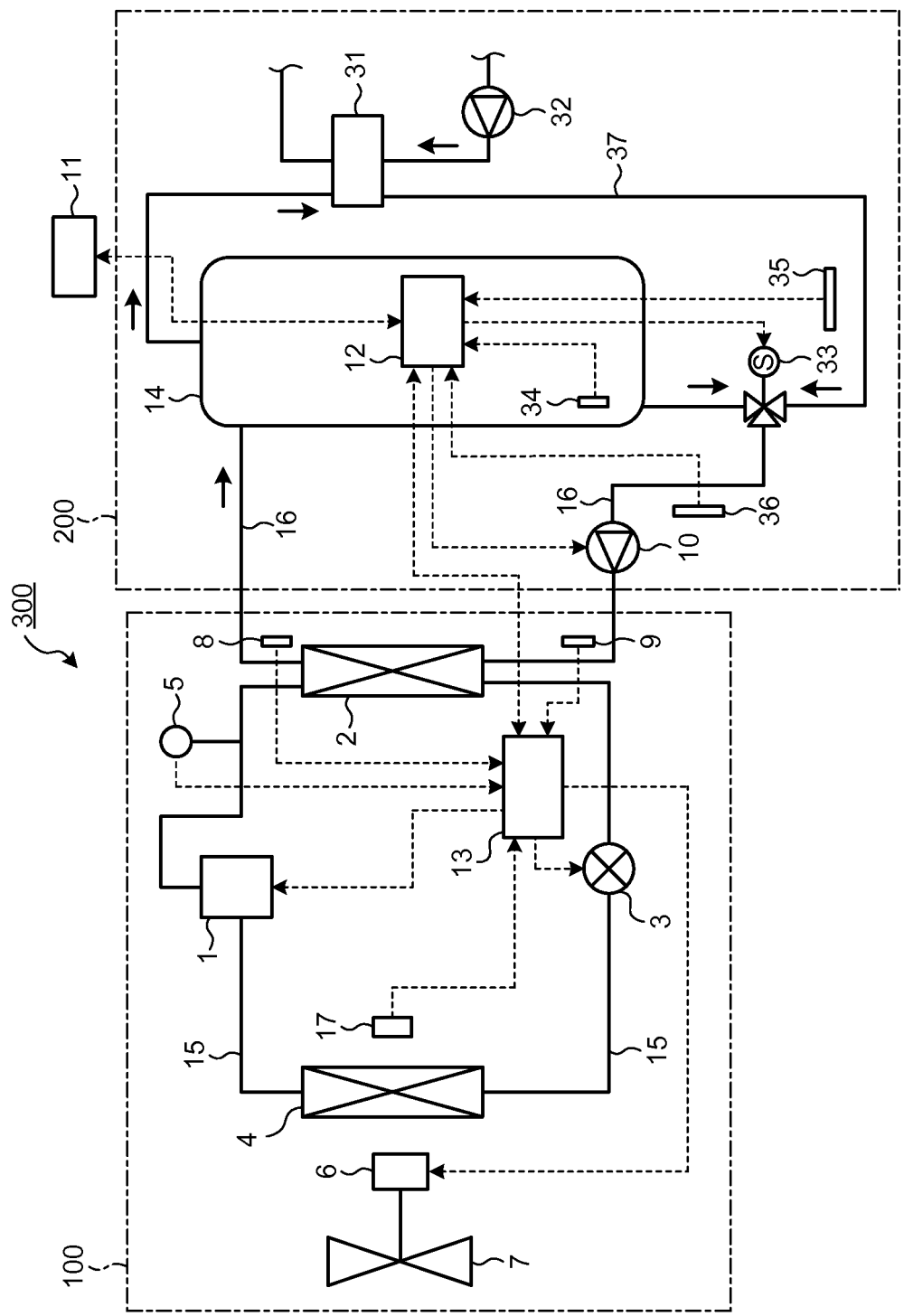
FIG. 1 is a configuration diagram of a heat-pump type water heater according to a first embodiment.

FIG. 1 is a configuration diagram of a heat-pump type water heater according to the present embodiment. As illustrated in FIG. 1, a heat-pump type water heater 300 includes a heat pump unit 100, a tank unit 200, and an operating unit 11 that is used when a user performs a drive operation and the like.

In FIG. 1, the heat pump unit 100 includes a compressor 1 (for example, a rotary compressor or a scroll compressor) that compresses a refrigerant; a refrigerant-water heat exchanger 2 in which heat is exchanged between the refrigerant and water; a decompression device 3 that decompresses and expands the high-pressure refrigerant; an evaporator 4 that evaporates a low-pressure two-phase refrigerant; a refrigerant pipe 15 that connects the compressor 1, the refrigerant-water heat exchanger 2, the decompression device 3, and the evaporator 4 in a circular circuit; a pressure detection device 5 that detects discharge pressure of the compressor 1; a fan 7 that blows air into the evaporator 4; and a fan motor 6 that drives the fan 7. The compressor 1, the refrigerant-water heat exchanger 2, the decompression device 3, the evaporator 4, and the refrigerant pipe 15 that connects these in a circular circuit constitute a refrigerant circuit.

The heat pump unit 100 includes a boiling-point temperature detection unit 8 of the refrigerant-water heat exchanger 2; a feed-water temperature detection unit 9 of the refrigerant-water heat exchanger 2; and an ambient-air temperature detection unit 17, as a temperature detection unit.

The heat pump unit 100 also includes a heat-pump-unit control unit 13. The heat-pump-unit control unit 13 receives signals from the pressure detection device 5, the boiling-up temperature detection unit 8, the feed-water temperature detection unit 9, and the ambient-air temperature detection unit 17 and executes control of the number of revolutions of the compressor 1, control of the opening degree of the decompression device 3, and control of the number of revolutions of the fan motor 6.

The tank unit 200 includes a hot water tank 14 that stores hot water heated by exchanging heat with the high-temperature and high-pressure refrigerant in the refrigerant-water heat exchanger 2; a bathwater-reheating heat exchanger 31 that reheats bathwater; a bathwater circulating device 32 connected to the bathwater-reheating heat exchanger 31; a pump 10 being a hot-water circulating device arranged between the refrigerant-water heat exchanger 2 and the hot water tank 14; a hot-water circulating pipe 16 that connects the refrigerant-water heat exchanger 2 and the hot water tank 14; a mixing valve 33 connected to the refrigerant-water heat exchanger 2, the hot water tank 14, and the bathwater-reheating heat exchanger 31; and a bathwater reheating pipe 37 that connects the hot water tank 14 and the mixing valve 33. The refrigerant-water heat exchanger 2, the hot water tank 14, the pump 10, and the hot-water circulating pipe 16 constitute a water circuit.

The tank unit 200 also includes an in-tank water-temperature detection unit 34; a reheated water-temperature detection unit 35 that detects the water temperature after it has passed through the bathwater-reheating heat exchanger 31; and a mixed water-temperature detection unit 36 that detects the water temperature after it has passed through the mixing valve 33, as a temperature detection unit.

The tank unit 200 further includes a tank-unit control unit 12. The tank-unit control unit 12 receives signals from the in-tank water-temperature detection unit 34, the reheated water-temperature detection unit 35, and the mixed water-temperature detection unit 36, in order to execute control of the number of revolutions of the pump 10 and opening/closing control of the mixing valve 33. The tank unit 200 further performs sending and receiving of signals to and from the heat-pump-unit control unit 13 and to and from the operating unit 11.

The operating unit 11 is a remote controller or an operation panel including a switch for a user to set the temperature setting of the hot water or to instruct hot water to be supplied.

In FIG. 1, a normal boiling operation in the heat-pump type water heater 300 configured as described above is explained. When a boiling operation instruction from the operating unit 11 or the tank unit 200 is transmitted to the heat-pump-unit control unit 13, the heat pump unit 100 performs a boiling operation.

The heat-pump-unit control unit 13 executes control of the number of revolutions of the compressor 1, control of the opening degree of the decompression device 3, and control of the number of revolutions of the fan motor 6 on the basis of the detection values of the pressure detection device 5, the boiling-up temperature detection unit 8, and the feed-water temperature detection unit 9.

Further, the detection value detected by the boiling-up temperature detection unit 8 is transferred between the heat-pump-unit control unit 13 and the tank-unit control unit 12; and the tank-unit control unit 12 controls the number of revolutions of the pump 10 so that the temperature detected by the boiling-up temperature detection unit 8 becomes a target boiling-up temperature.

In the heat-pump type water heater 300 controlled as described above, the high-temperature and high-pressure refrigerant discharged from the compressor 1 reduces its temperature, while dissipating heat to a water supply circuit. The high-temperature and high-pressure refrigerant, which has dissipated heat and passed through the refrigerant-water heat exchanger 2, is decompressed by the decompression device 3. The refrigerant having passed through the decompression device 3 flows into the evaporator 4, and absorbs heat from ambient-air. The low-pressure refrigerant having been discharged from the evaporator 4 is drawn into the compressor 1 to repeat circulation, thereby forming a refrigeration cycle.

Meanwhile, water in a lower part in the hot water tank 14 is guided to the refrigerant-water heat exchanger 2 driven by the pump 10 which is the hot-water circulating device. Water is heated by heat dissipation from the refrigerant-water heat exchanger 2; and the heated hot water passes through the hot-water circulating pipe 16 and is returned to an upper part of the hot water tank 14 and stored.

As explained above, in the heat-pump type water heater 300, the pump 10 is used as the hot-water circulating device that circulates hot water through the hot-water circulating pipe 16 between the hot water tank 14 and the refrigerant-water heat exchanger 2.

Figure 2:
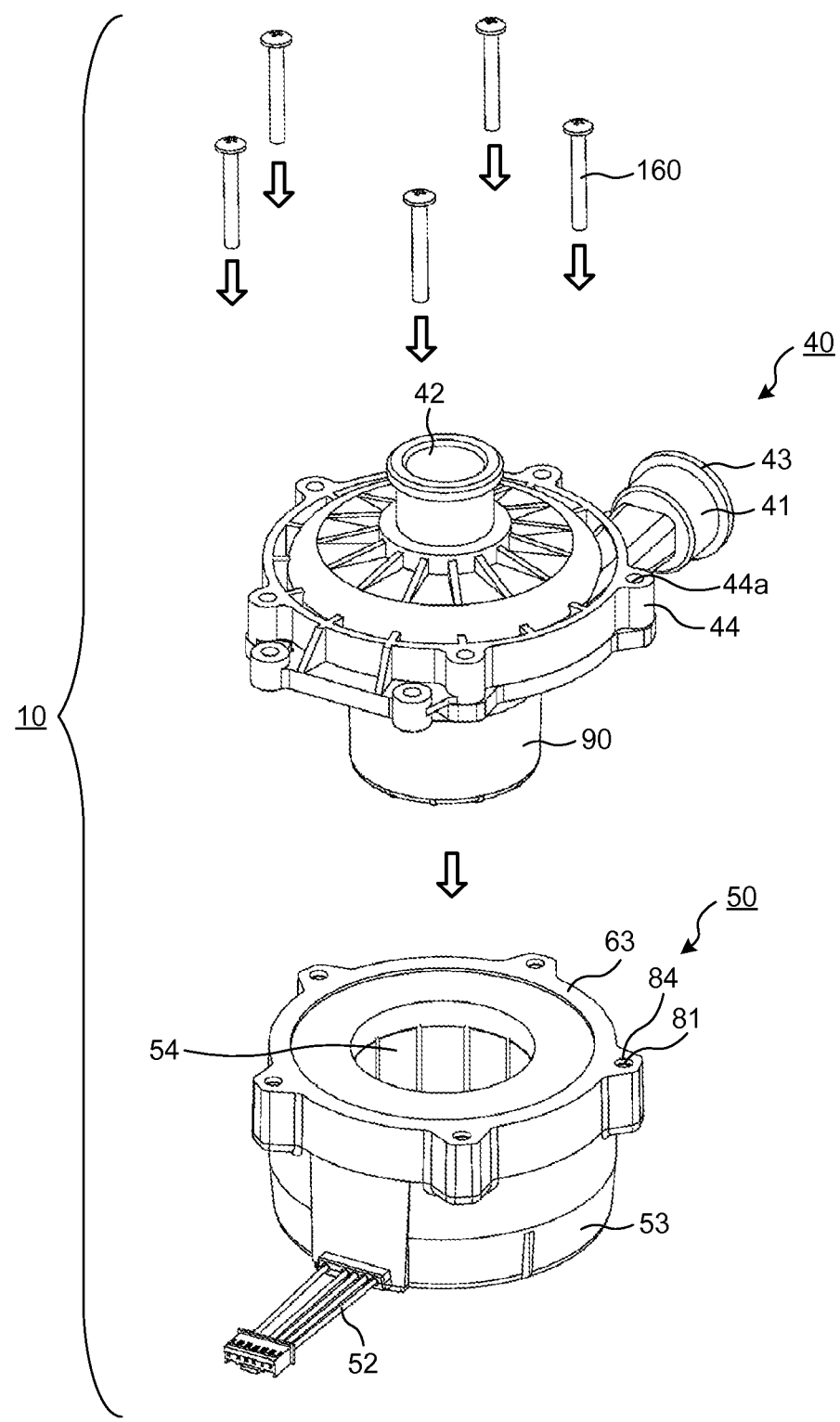
FIG. 2 is an exploded perspective view of a pump 10 according to the first embodiment.

The pump 10 according to the present embodiment is explained next. FIG. 2 is an exploded perspective view of the pump 10 according to the present embodiment.

As illustrated in FIG. 2, the pump 10 includes a pump unit 40 that absorbs and discharges water by the revolution of the rotor (described later); a molded stator 50 that drives the rotor; and tapping screws 160 that fasten the pump unit 40 to the molded stator 50. In an example illustrated in FIG. 2, the number of tapping screws 160 is, for example, five. However, the number of tapping screws is not limited thereto.

Figure 5:
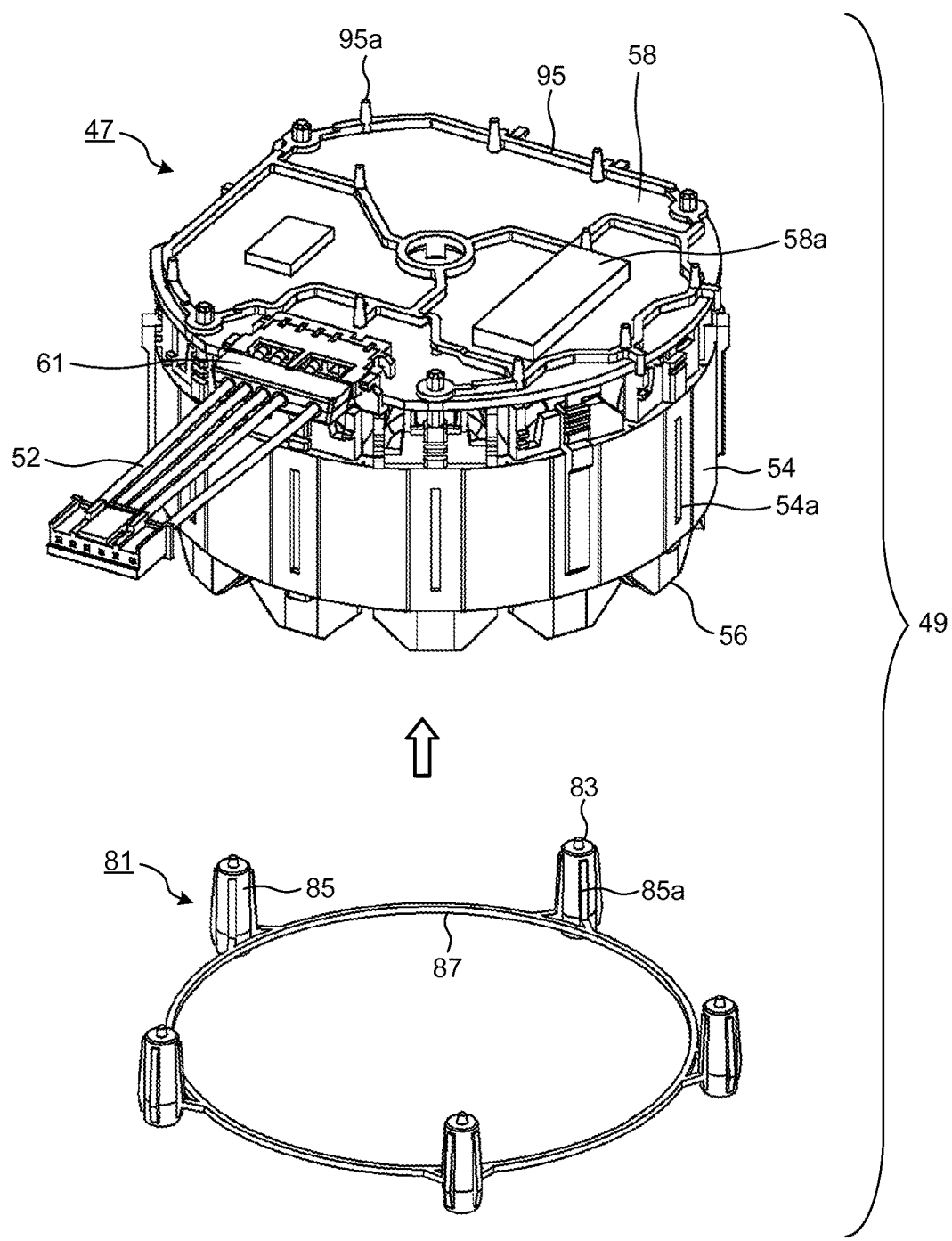
FIG. 5 is an exploded perspective view of a stator assembly 49.

The pump 10 is assembled by fastening five tapping screws 160 to pilot holes 84 of a pilot hole component 81 (for details, refer to FIG. 5 illustrated later) embedded in the molded stator 50 via screw holes 44a formed in a boss 44 of the pump unit 40.

In FIG. 2, a casing 41, an intake 42, a discharge outlet 43, a cup-shaped partition component 90, a lead wire 52, a mold resin 53, a stator iron core 54, and a pump-unit installation surface 63 are illustrated but they do not appear in the configurations explained above. These elements are explained later.

Figure 3:
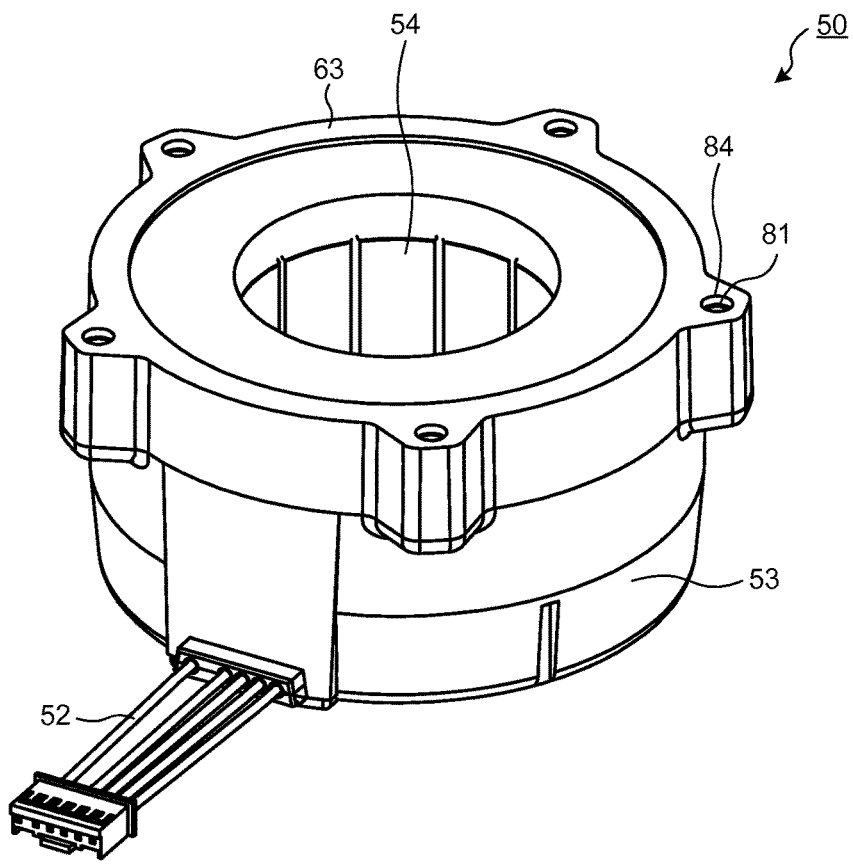
FIG. 3 is a perspective view of a molded stator 50.
Figure 4:
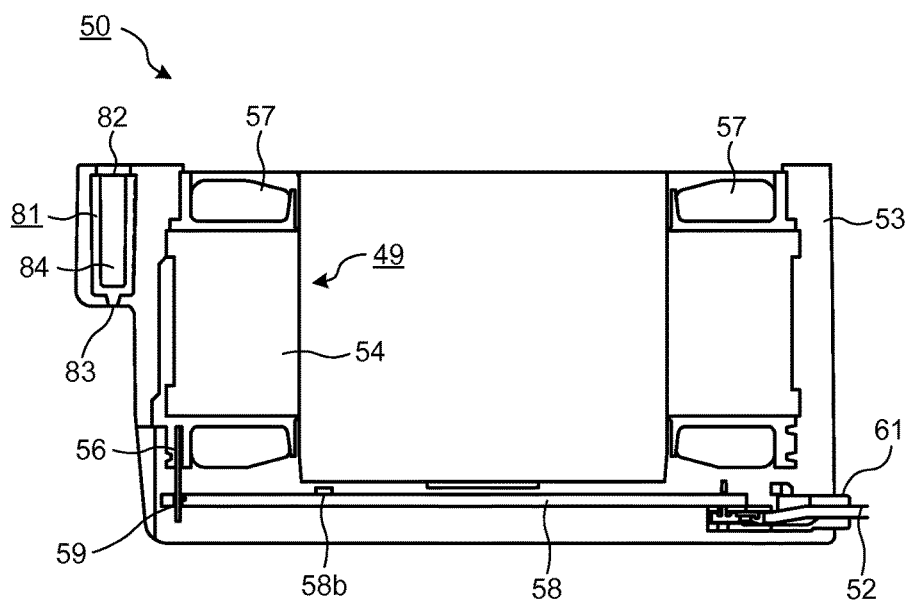
FIG. 4 is a cross-sectional view of the molded stator 50.

The configuration of the molded stator 50 is explained first with reference to FIGS. 3 to 5. FIG. 3 is a perspective view of the molded stator 50, FIG. 4 is a cross-sectional view of the molded stator 50, and FIG. 5 is an exploded perspective view of a stator assembly 49.

The molded stator 50 is acquired by molding the stator assembly 49 by using the mold resin 53 (FIGS. 3 and 4).

On one end face of the molded stator 50 in an axial direction, specifically, on an end face on the side of the pump unit 40 (refer also to FIG. 2), a flat pump-unit installation surface 63 is provided along an outer peripheral edge thereof.

A leg part 85 (refer to FIGS. 4 and 5) of the pilot hole component 81 is axially embedded at five places in the pump-unit installation surface 63. The leg part 85 is, for example, a substantially columnar resin molded component. At the time of mold forming by using the mold resin 53, one end face of the leg part 85 (the end face on the side of the pump unit 40) becomes a die pressing part 82 of a molding die (refer to FIG. 4). Therefore, the pilot hole component 81 is exposed in a form of being embedded inward from the pump-unit installation surface 63 by a predetermined distance. The exposed parts are the die pressing part 82 and the pilot hole 84 for the tapping screw 160.

The lead wire 52 pulled out from the stator assembly 49 is pulled out to the outside from a vicinity of the axial end face of the molded stator 50 opposite to the side of the pump unit 40.

Axial positioning of the molded stator 50 by the mold resin 53 (for example, thermosetting resin) at the time of mold forming is performed by axial end faces of a plurality of protrusions 95a, which are formed in a substrate pressing component 95 (refer to FIG. 5), functioning as a pressing part of an upper die. Therefore, the axial end faces (die pressing surfaces) of the protrusions 95a are exposed (not illustrated) from the axial end face of the molded stator 50 on a side of a substrate 58.

An axial end face of an insulation part 56 on an opposite side to a wire connection (on the side of the pump unit 40) becomes a die pressing part of a lower die. Accordingly, from the axial end face of the molded stator 50 on the opposite side to the substrate 58, the end face of the insulation part 56 on the opposite side to the wire connection is exposed (not illustrated).

Radial positioning of the molded stator 50 at the time of mold forming is made by fitting an inner periphery of the stator iron core to the die. Therefore, tip ends of teeth (the inner periphery) of the stator iron core 54 are exposed to the inner periphery of the molded stator 50 illustrated in FIG. 3.

The internal configuration of the molded stator 50, that is, the configuration or the like of the stator assembly 49 is described next.

As illustrated in FIG. 5, the stator assembly 49 includes a stator 47 and a pilot hole component 81. As illustrated in FIGS. 4 and 5, the stator 47 includes the lead wire 52, the stator iron core 54 provided with grooves 54a, the insulation part 56, a coil 57, an IC 58a, a Hall element 58b, the substrate 58, a terminal 59, a lead-wire leading component 61, and a substrate pressing component 95. The pilot hole component 81 includes leg parts 85, protrusions 83 and 85a provided in the leg parts 85, and a connection part 87.

The stator assembly 49 is manufactured in the procedure described below.

(1) An electromagnetic steel plate having a thickness of, for example, 0.1 millimeter to 0.7 millimeter is punched in a belt-like form, and the annular stator iron core 54 laminated by swaging, welding, or bonding is made from the electromagnetic steel plate. The stator iron core 54 has a plurality of teeth. Tip ends of the teeth of the stator iron core 54 are exposed to the inner periphery of the molded stator 50 illustrated in FIG. 3. The stator iron core 54 illustrated here has, for example, 12 teeth connected with thin connection parts. Therefore, in FIG. 3, the tip ends of the teeth of the stator iron core 54 are exposed at 12 positions. However, only five teeth of the 12 teeth are viewed in FIG. 3.

(2) The insulation part 56 is applied to the teeth of the stator iron core 54. The insulation part 56 is formed integrally with or separately to the stator iron core 54 by using, for example, a thermoplastic resin such as PBT (polybutylene terephthalate).

(3) A concentratedly wound coil 57 (refer to FIG. 4) is wound around the teeth applied with the insulation part 56. By connecting 12 concentratedly wound coils 57, three-phase single Y-connection windings are formed.

(4) Because of the three-phase single Y-connection, terminals 59 (refer to FIG. 4, supply terminals to which power is supplied, and a neutral terminal) to which the coils 57 (refer to FIG. 4) of respective phases (a U phase, a V phase, and a W phase) are connected are assembled on the connection side of the insulation part 56. There are three supply terminals and one neutral terminal.

(5) The substrate 58 is attached to the insulation part 56 on the connection side (on the side where the terminals 59 are assembled). The substrate 58 is held between the substrate pressing component 95 and the insulation part 56. An electronic component is mounted on the substrate 58, for example, the IC 58a (drive element) that drives a motor (for example, a brushless DC motor), the Hall element 58b that detects the position of the rotor 60 (refer to FIG. 4, a magnetic-pole position detection element), and the like are provided thereon. Because the IC 58a is mounted on the side of the substrate pressing component 95 of the substrate 58, it is illustrated in FIG. 5. However, the Hall element 58b is hidden and not seen in FIG. 5, because it is mounted on the opposite side to the IC 58a. Further, the substrate 58 is attached with the lead-wire leading component 61 that leads out the lead wire 52 in a notched portion near the outer periphery thereof.

(6) The substrate 58 attached with the lead-wire leading component 61 is fixed to the insulation part 56 by the substrate pressing component 95; and the pilot hole component 81 is assembled on the stator 47 to which the terminals 59 and the substrate 58 are soldered, thereby completing the stator assembly 49 (refer to FIG. 5).

The configuration of the pilot hole component 81 is explained next with reference to FIG. 5. The pilot hole component 81 is formed by molding a thermoplastic resin such as PBT (polybutylene terephthalate).

As illustrated in FIG. 5, the pilot hole component 81 is configured by circularly connecting a plurality (for example, five) of leg parts 85 in a substantially columnar shape with the thin connection part 87. The leg part 85 is provided with the pilot hole 84 to be screwed into with the tapping screw 160 (refer to FIG. 2). The leg part 85 has a tapered shape, in which the leg part 85 becomes thicker from the exposed end face (the die pressing part 82 and the end face of the protrusion 83) toward the axial center. By having such a tapered shape, the pilot hole component 81 is effectively prevented from falling off after performing mold forming with the stator 47.

The pilot hole component 81 includes the plurality of protrusions 85a on the outer periphery of the leg part 85 for preventing rotation. In the example illustrated in FIG. 5, four protrusions 85a are provided on the outer periphery of the leg part 85. The protrusion 85a is formed to extend in a height direction (an axial direction) of the leg part 85 with a predetermined circumferential width. Further, the protrusion 85a protrudes from an outer peripheral surface of the leg part 85 by a required predetermined dimension in order to prevent the pilot hole component 81 from being rotated. The pilot hole component 81 can be set to the molding die in the first attempt by connecting the substantially columnar leg parts 85 with the thin connection part 87, thereby enabling the machining cost to be reduced.

By providing a plurality of claws (not illustrated) for assembling the pilot hole component 81 on the stator 47 in the connection part 87 of the pilot hole component 81 and latching the claws of the pilot hole component 81 into the grooves 54a formed on the outer periphery of the stator iron core 54 of the stator 47, the stator 47 and the pilot hole component 81 can be set to the molding die in the first attempt, thereby enabling the machining cost to be reduced.

When the stator assembly 49 is mold-formed by the mold resin 53 after latching the pilot hole component 81 to the stator 47, the axial positioning of the pilot hole component 81 is performed by holding the die pressing part 82 and the protrusions 83 of the pilot hole component 81 by the mold forming die.

An outer diameter of the die pressing part 82 can be set smaller than an outer diameter of an opening-side end face of the pilot hole component 81 (refer to FIG. 4). Thus, the end face of the pilot hole component 81 of a portion excluding the die pressing part 82 is covered with the mold resin 53. Therefore, because the opposite end face of the pilot hole component 81 is covered with the mold resin 53, exposure of the pilot hole component 81 is suppressed, thereby enabling the quality of the pump 10 to be improved.

The molded stator 50 is obtained by integrally molding the pilot hole component 81 assembled on the stator 47 by the mold resin 53. In this case, the pilot holes 84 are molded so as to be exposed. By and assembling and fastening the pump unit 40 and the molded stator 50 to the pilot hole 84 with the tapping screws 160 via the screw holes 44a formed in the pump unit 40, the pump unit 40 and the molded stator 50 can be firmly assembled together (refer to FIG. 2).

Figure 6:
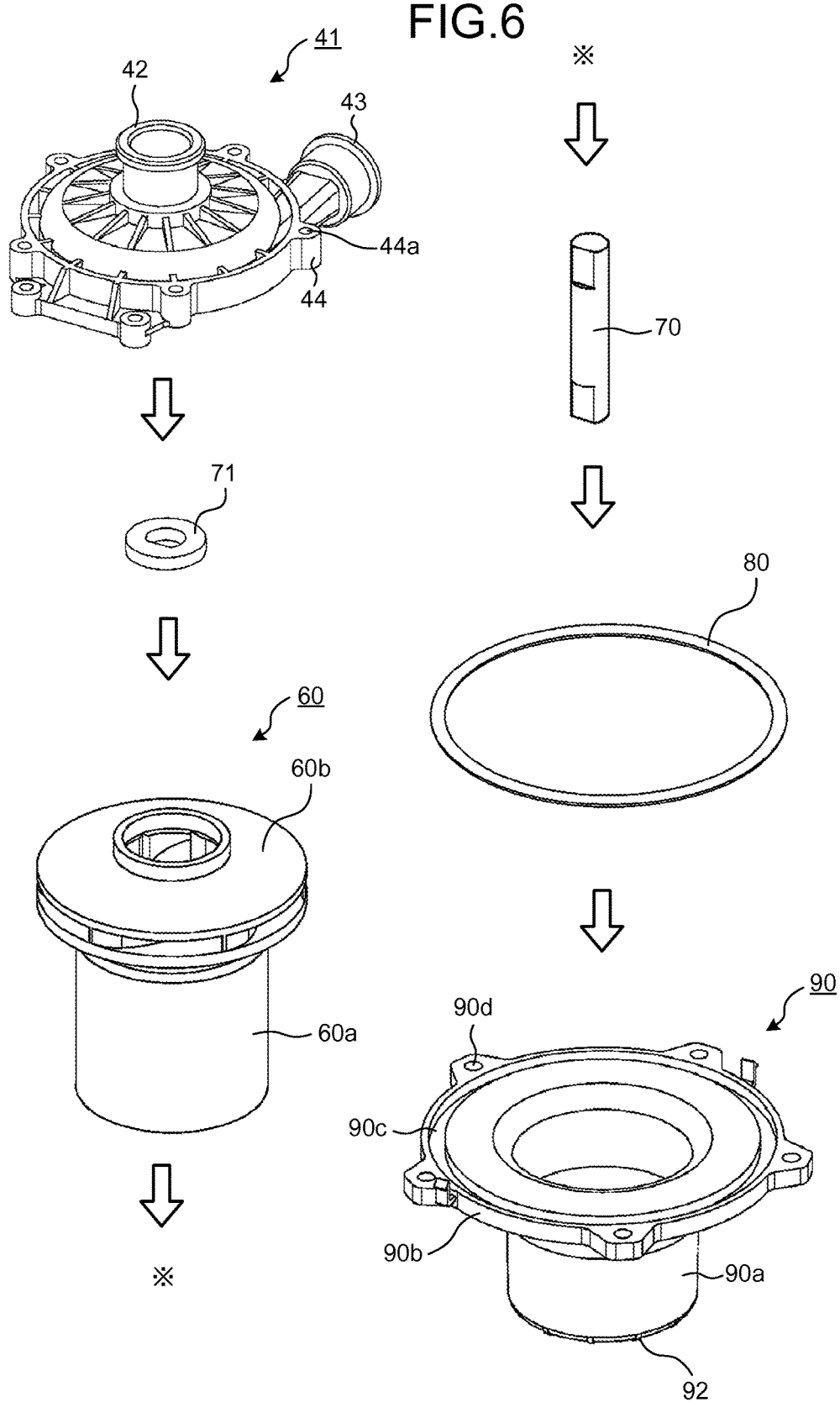
FIG. 6 is an exploded perspective view of a pump unit 40.
Figure 7:
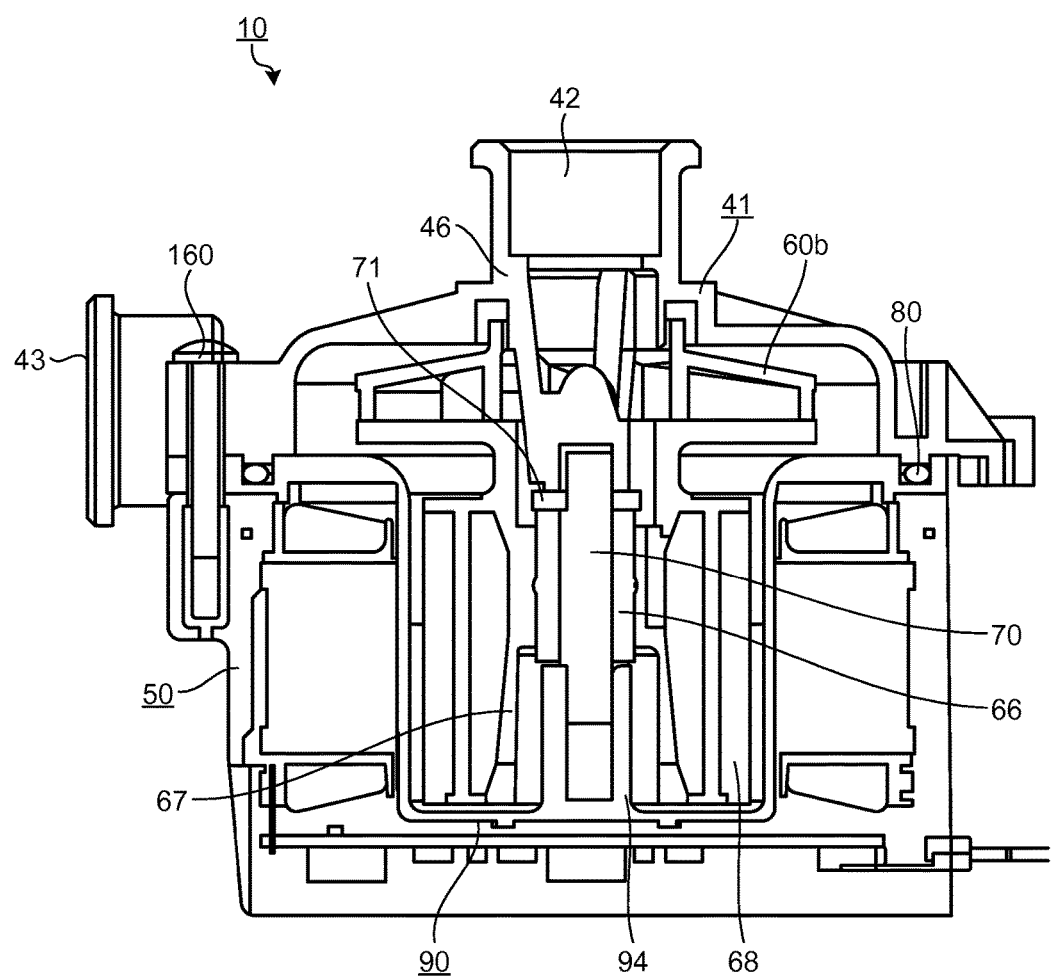
FIG. 7 is a cross-sectional view of the pump 10.
Figure 8:
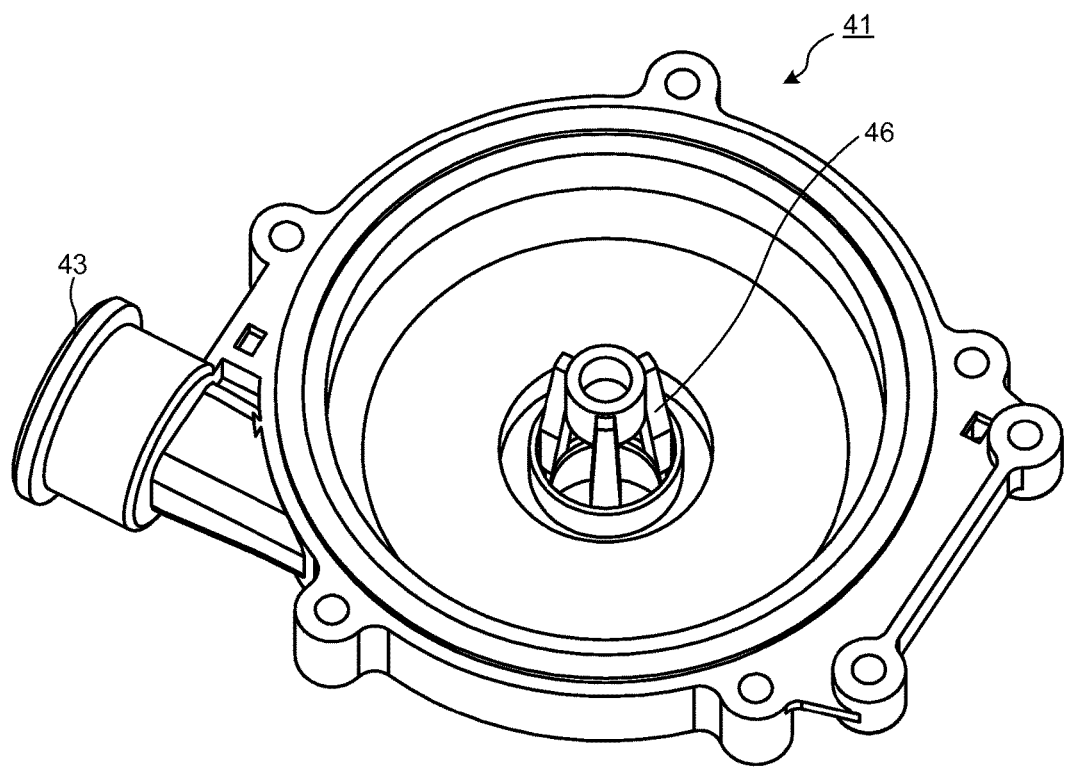
FIG. 8 is a perspective view of a casing 41 viewed from a side of a shaft support portion 46.

The configuration of the pump unit 40 is to be explained next with reference to FIGS. 6 to 8. FIG. 6 is an exploded perspective view of the pump unit 40, FIG. 7 is a cross-sectional view of the pump 10, and FIG. 8 is a perspective view of the casing 41 viewed from a side of a shaft support portion 46. The pump unit 40 includes the following elements:

(1) Casing 41 that has the intake 42 and the discharge outlet 43 of fluid and houses an impeller 60b of the rotor 60 therein: The casing 41 is molded by using a thermoplastic resin, for example, PPS (polyphenylene sulfide). A boss 44 with a screw hole 44a, which is used at the time of assembling the pump unit 40 and the molded stator 50, is provided at five positions.

(2) Thrust bearing 71: The material of the thrust bearing 71 is a ceramic, for example, alumina. The rotor 60 is pressed against the casing 41 via the thrust bearing 71, due to a pressure difference acting on the both sides of the impeller 60b of the rotor 60 during the operation of the pump 10. Therefore, a thrust bearing made of a ceramic is used as the thrust bearing 71 to ensure wear resistance and sliding properties.

(3) Rotor 60: The rotor 60 includes a rotor unit 60a and the impeller 60b. In the rotor unit 60a, a ring-shaped (cylindrical or annular) resin magnet 68 (an example of a magnet) molded by using a pellet formed by kneading a magnetic powder, for example, ferrite powder and resin and a cylindrical sleeve bearing 66 (for example, made of carbon) provided inside of the resin magnet 68 are integrated at a resin portion 67 made of such as, for example, PPE (polyphenylene ether) (refer to FIG. 9 explained later). The impeller 60b is a resin molded product of, for example, PPE (polyphenylene ether). The rotor unit 60a and the impeller 60b are bonded by, for example, ultrasonic welding.

(4) Shaft 70: The material of the shaft 70 (a rotary shaft) is a ceramic, for example, alumina, or SUS. Because the shaft 70 slides with the sleeve bearing 66 provided in the rotor 60, a material such as a ceramic or SUS is selected so as to ensure the wear resistance and sliding properties. One end of the shaft 70 is inserted into a shaft support portion 94 of the cup-shaped partition component 90; and the other end of the shaft 70 is inserted into the shaft support portion 46 of the casing 41. Therefore, the one end of the shaft 70 to be inserted into the shaft support portion 94 is inserted therein so as not to rotate with respect to the shaft support portion 94. Therefore, the one end of the shaft 70 is substantially D shaped, which is obtained by cutting a part of a circular form by a predetermined length (in an axial direction). A hole in the shaft support portion 94 has a shape matched with the shape of the one end of the shaft 70. Further, the other end of the shaft 70 to be inserted into the shaft support portion 46 is also substantially D shaped, which is obtained by cutting a part of a circular form by a predetermined length (in an axial direction), and thus the shaft 70 has a symmetrical shape in a lengthwise direction. However, the other end of the shaft 70 is inserted rotatably into the shaft support portion 46. The reason why the shaft is symmetrical in the lengthwise direction is because, at the time of inserting the shaft 70 into the shaft support portion 94, it is possible to assemble it without taking into consideration whether the direction is up or down (refer to FIG. 6).

(5) O-ring 80: The material of the O-ring 80 is, for example, EPDM (ethylene-propylene-diene rubber). The O-ring 80 seals the casing 41 from the cup-shaped partition component

90 of the pump unit 40. In a pump mounted on a hot water dispenser, heat resistance and long life are required for sealing the piping. Therefore, the material such as EPDM is used to ensure the resistance properties.

(6) Cup-shaped partition component 90: The cup-shaped partition component 90 is molded by using a thermoplastic resin, for example, PPE (polyphenylene ether). The cup-shaped partition component 90 includes a cup-shaped partition wall portion 90*a* that is a joint with the molded stator 50, and a flange portion 90*b*. The cup-shaped partition wall portion 90*a* is formed of a circular bottom and a cylindrical partition wall. The shaft support portion 94, into which the one end of the shaft 70 is inserted, is provided in a standing condition substantially at the center on an internal surface of the bottom of the cup-shaped partition wall portion 90*a*. On an external surface of the bottom of the cup-shaped partition wall portion 90*a*, a plurality of ribs 92 are radially formed in a radial direction. A plurality of reinforcing ribs (not illustrated) are radially formed on the flange portion 90*b* in the radial direction. The flange portion 90*b* also includes an annular rib (not illustrated) housed in the pump-unit installation surface 63 of the pump unit 40. The flange portion 90*b* is formed with a hole 90*d*, through which the tapping screw 160 passes, at five positions. A circular O-ring housing groove 90*c* for housing the O-ring 80 is formed on a surface of the flange portion 90*b* on the side of the casing 41.

The pump 10 is constructed by fixing the casing 41 to the cup-shaped partition component 90 after installing the O-ring 80 in the cup-shaped partition component 90 and installing the shaft 70, the rotor 60, and the thrust bearing 71 in the cup-shaped partition component 90 to construct the pump unit 40; and further fixing the pump unit 40 to the molded stator 50 by the assembly tapping screws 160 and the like.

By fitting the ribs 92 provided on the bottom of the cup-shaped partition component 90 to the groove (not illustrated) in the molded stator 50, circumferential positioning of the pump unit 40 and the molded stator 50 is performed.

The rotor 60 is housed inside of the cup-shaped partition wall portion 90*a*. The rotor 60 is fitted to the shaft 70 inserted into the shaft support portion 94 of the cup-shaped partition component 90. Therefore, to ensure concentricity between the molded stator 50 and the rotor 60, it is better to keep the gap between an inner circumference of the molded stator 50 and an outer circumference of the cup-shaped partition wall portion 90*a* as small as possible. For example, the gap is set to be about 0.02 millimeter to 0.06 millimeter.

However, if the gap between the inner circumference of the molded stator 50 and the outer circumference of the cup-shaped partition wall portion 90*a* is too small, the escape route for air becomes narrow when the cup-shaped partition wall portion 90*a* is inserted into the inner circumference of the molded stator 50, thereby making it difficult to insert the cup-shaped partition component 90.

Figure 9:
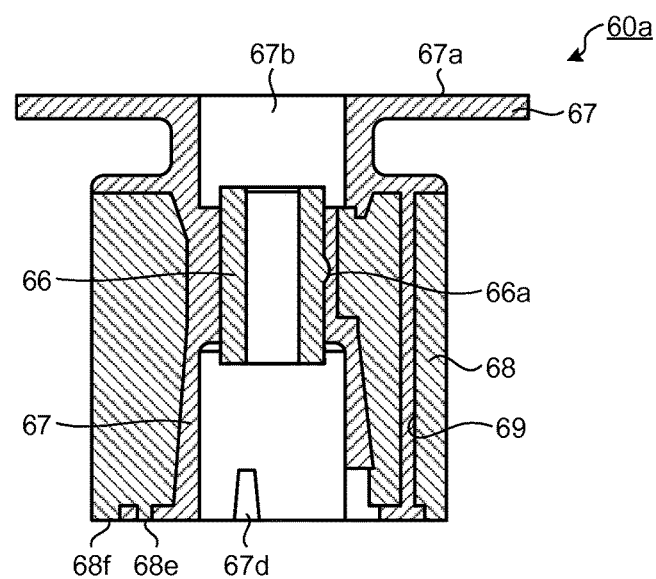
FIG. 9 is a cross-sectional view of a rotor unit 60a (specifically, a cross-sectional view on arrow A-A in FIG. 11).
Figure 10:
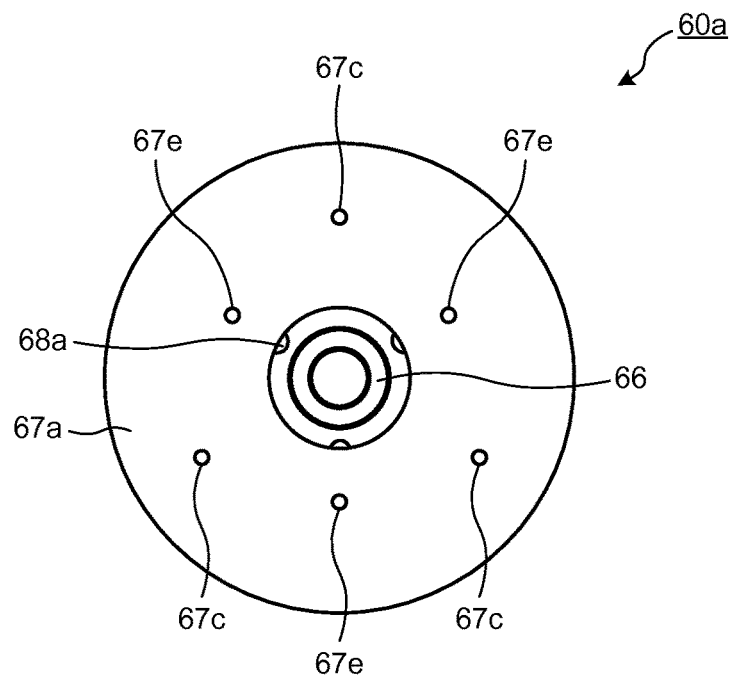
FIG. 10 is a view of the rotor unit 60a viewed from a side of an impeller attachment unit.
Figure 11:
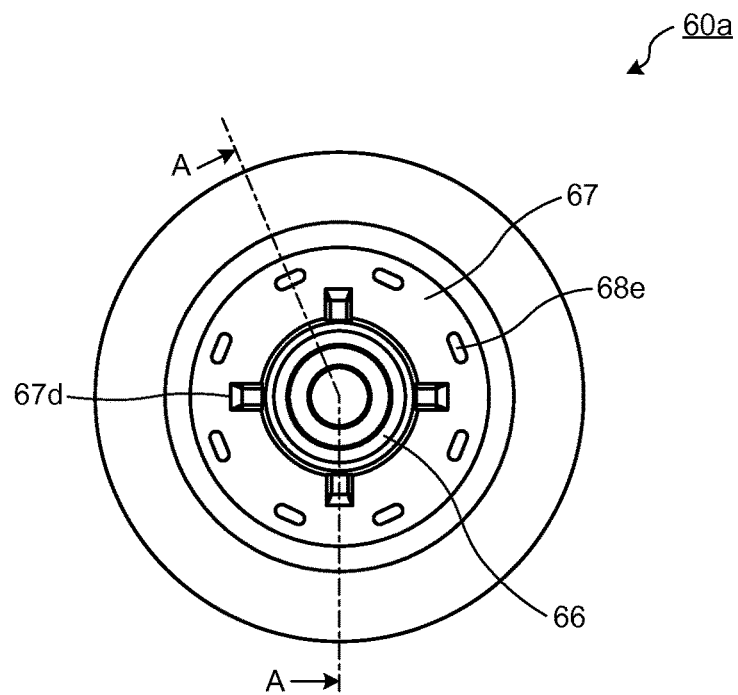
FIG. 11 is a view of the rotor unit 60a viewed from an opposite side to the side of the impeller attachment unit.
Figure 12:
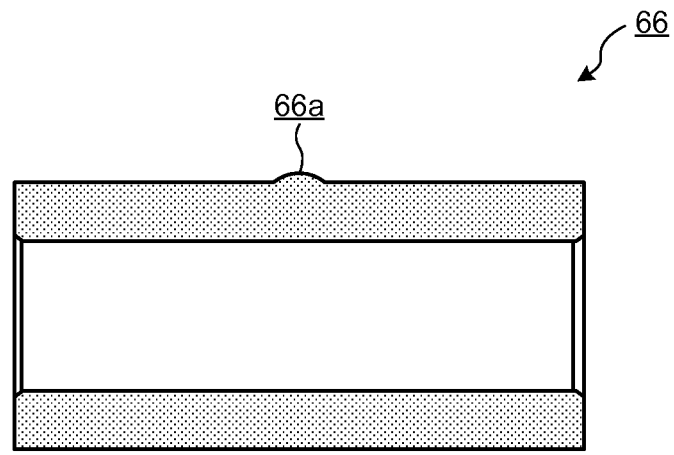
FIG. 12 is an enlarged cross-sectional view of a sleeve bearing 66.

FIG. 9 is a cross-sectional view of the rotor unit 60*a* (specifically, a cross-sectional view along arrow A-A in FIG. 11); FIG. 10 is a view of the rotor unit 60*a* viewed from a side of an impeller attachment unit; FIG. 11 is a view of the rotor unit 60*a* viewed from an opposite side to the side of the impeller attachment unit; and FIG. 12 is an enlarged cross-sectional view of the sleeve bearing 66.

The rotor unit 60*a* is explained with reference to FIGS. 9 to 12. As illustrated in FIGS. 9 to 12, the rotor unit 60*a* includes at least the following elements:
(1) Resin magnet 68;
(2) Sleeve bearing 66; and (3) Resin portion 67. The resin portion 67 is constituted by a thermoplastic resin, for example, PPE (polyphenylene ether). The impeller attachment unit 67*a*, to which the impeller 60*b* is attached, is formed in the resin portion 67. The resin magnet 68 and the sleeve bearing 66 are integrally molded by using the resin portion 67.

The resin magnet 68 is substantially ring shaped (cylindrical or annular shape), and is molded by using the pellet formed by kneading it with a magnetic powder, for example, ferrite powder and resin.

The sleeve bearing 66 (for example, made of carbon) is provided inside of the resin magnet 68. The sleeve bearing 66 has a cylindrical shape. The sleeve bearing 66 is fitted to the shaft 70 which is assembled on the cup-shaped partition component 90 of the pump 10 to rotate. Therefore, the sleeve bearing 66 is fabricated by a material suitable for the bearing, for example, a thermoplastic resin such as PPS (polyphenylene sulfide) added with sintered carbon or carbon fiber, or a ceramic. The sleeve bearing 66 is provided with a drawing-out taper (not illustrated), which has an outer diameter decreasing with distance from a substantially axial center toward the opposite ends, and is provided with, for example, a plurality of semispherical protrusions 66*a* (refer to FIG. 12) on an outer periphery, which prevent the rotation substantially at an axial center.

A depression 67*b* is formed in a portion contacting to an end face of the resin magnet 68 on the side of the impeller attachment unit of the resin portion 67, corresponding to a magnet pressing part (not illustrated) provided on the upper die of the resin molding die. The depression 67*b* is formed substantially at the center in a radial direction in the example illustrated in FIG. 9. The depression 67*b* is formed at a position substantially facing the protrusion 68*a* of the resin magnet 68 in the axial direction.

As illustrated in FIG. 10, a plurality of impeller positioning holes 67*c* for attaching the impeller 60*b* are made in the impeller attachment unit 67*a*. For example, three impeller positioning holes 67*c* are formed substantially at a regular interval in the circumferential direction. The impeller positioning holes 67*c* penetrate the impeller attachment unit 67*a*. The impeller positioning holes 67*c* are respectively formed on a radial extension line in the middle of two protrusions 68*a* (refer to FIG. 10) among the three protrusions of the resin magnet 68.

Furthermore, as illustrated in FIG. 10, for example, three gates 67*e*, which are to be used when the rotor unit 60*a* is molded by using the thermoplastic resin (the resin portion 67), are respectively formed substantially at a regular interval in the circumferential direction. The respective gates 67*e* are formed on the radial extension line of the protrusions of the resin magnet 68, and inside relative to the impeller positioning holes 67*c*.

Notches 67*d* to be fitted to a positioning protrusion (not illustrated) provided in the lower die of the resin molding die are formed in a portion of the resin portion 67 formed by contacting to an inner periphery of the resin magnet 68 opposite to the side of the impeller attachment unit 67*a* (refer to FIGS. 9 and 11). The notch 67*d* are formed at four positions substantially with an interval of 90 degrees in the example illustrated in FIG. 11. A plurality (eight in the example illustrated in FIG. 11) of protrusions 68*e*, being a part of the resin magnet 68, are exposed from the resin portion 67 (refer to FIG. 11).

A plurality of through holes 69, each extending in the axial direction and being provided in the resin magnet 68, and the inside of each of the through holes 69 is filled with the thermoplastic resin. That is, the thermoplastic resin in the through holes 69 constitutes a part of the resin portion 67.

Figure 13:
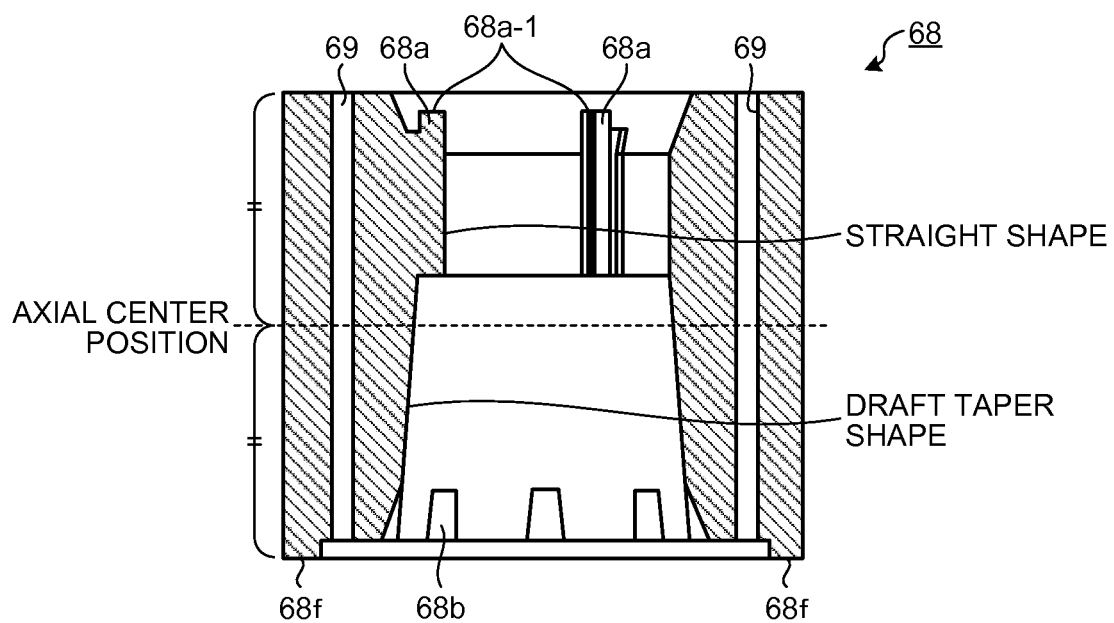
FIG. 13 is a cross-sectional view of a resin magnet 68 (specifically, a cross-sectional view on arrow B-B in FIG. 14).
Figure 14:
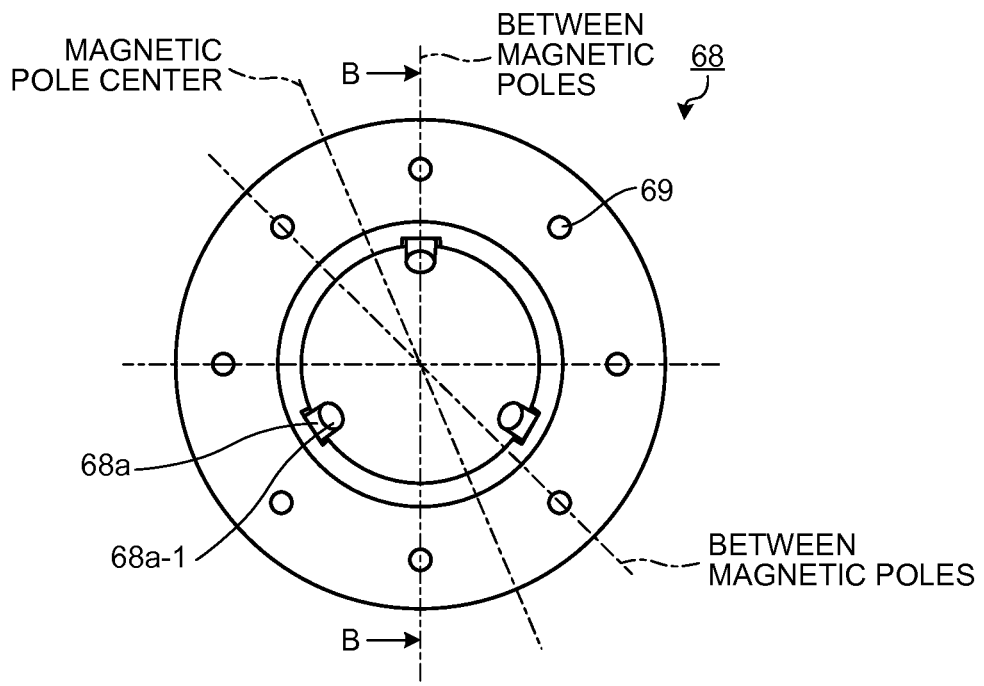
FIG. 14 is a view of the resin magnet 68 viewed from the side of a protrusion 68a (the side of the impeller attachment unit).
Figure 15:
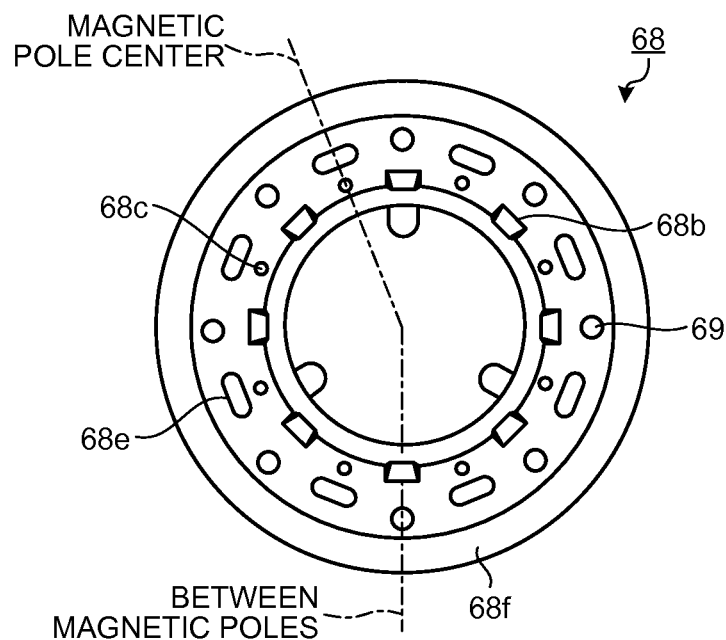
Figure 16:
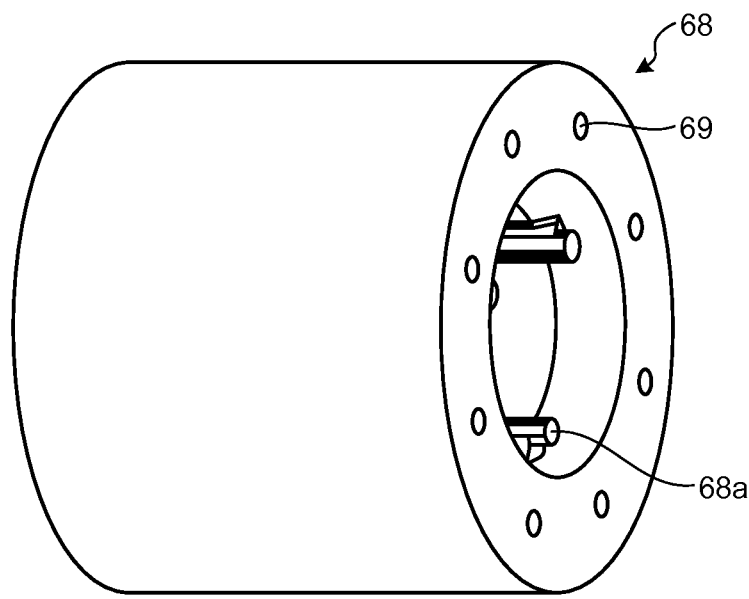
Figure 17:
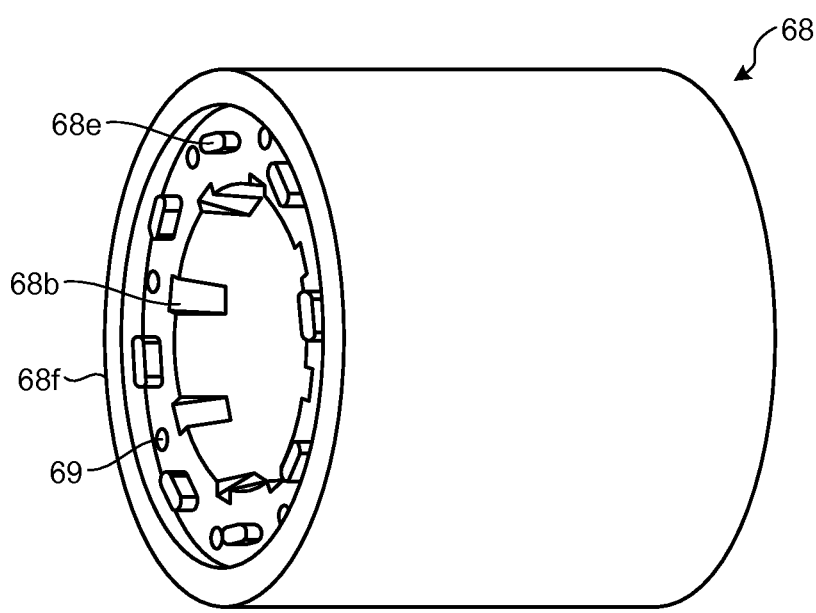
Figure 18:
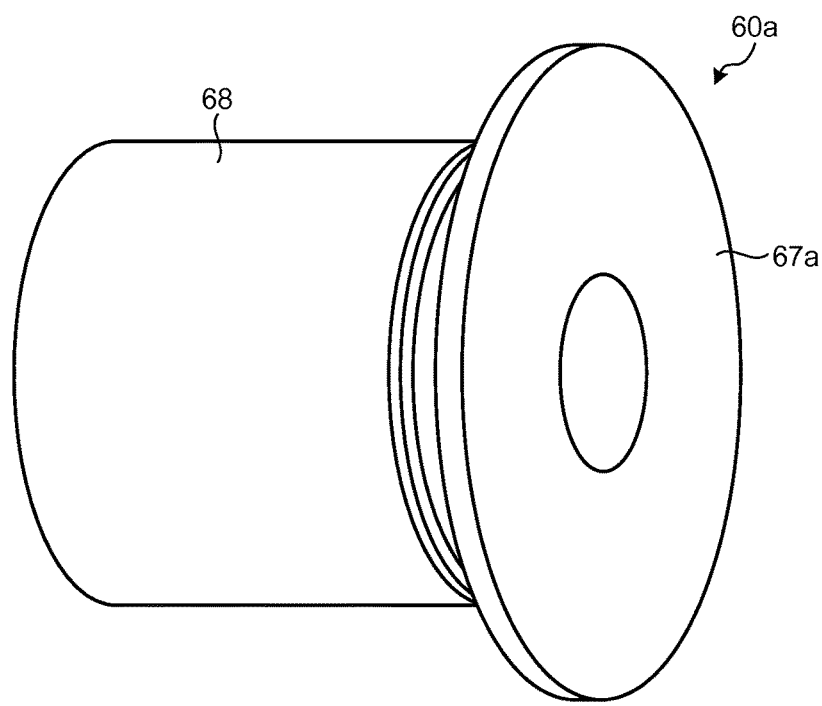
FIG. 18 is a perspective view of the rotor unit 60a viewed from the side of the impeller attachment unit.
Figure 19:
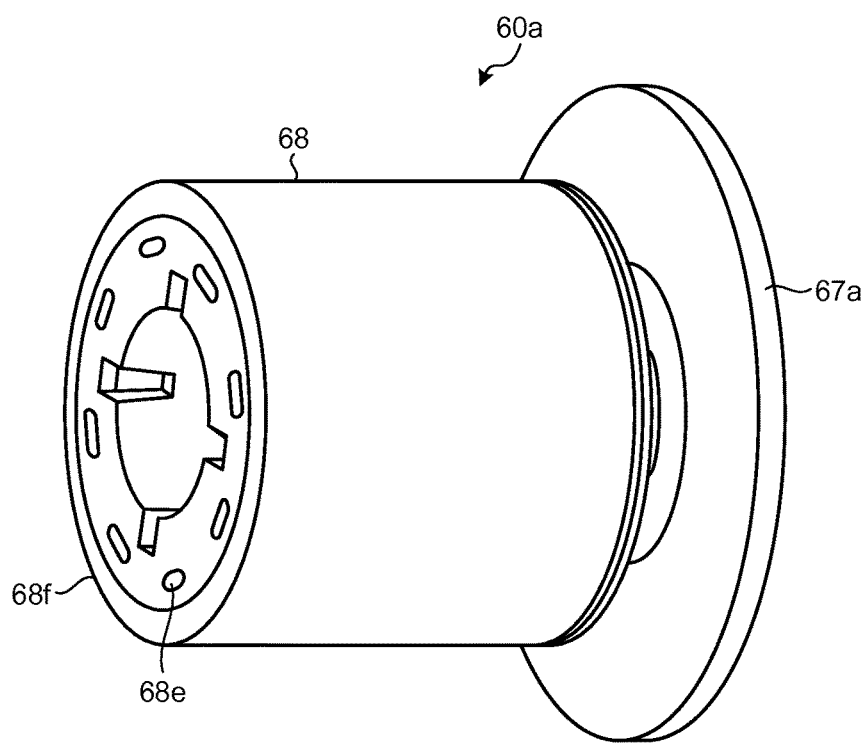
FIG. 19 is a perspective view of the rotor unit 60a viewed from an opposite side to the side of the impeller attachment unit.

FIG. 13 is a cross-sectional view of a resin magnet 68 (specifically, a cross-sectional view in the direction of arrow B-B in FIG. 14); FIG. 14 is a view of the resin magnet 68 viewed from the side of a protrusion 68a (the side of the impeller attachment unit); FIG. 15 is a view of the resin magnet 68 viewed from an opposite side to the side of the protrusion 68a; FIG. 16 is a perspective view of the resin magnet 68 viewed from the side of the protrusion 68a; and FIG. 17 is a perspective view of the resin magnet 68 viewed from the opposite side to the side of the protrusion 68a. FIG. 18 is a perspective view of the rotor unit 60a viewed from the side of the impeller attachment unit; and FIG. 19 is a perspective view of the rotor unit 60a viewed from an opposite side to the side of the impeller attachment unit.

The configuration of the resin magnet 68 is explained referring to FIGS. 13 to 19. The resin magnet 68 illustrated here has, for example, eight magnetic poles. The resin magnet 68 includes a plurality of tapered notches 68b, each arranged substantially at a regular interval in the circumferential direction on the inner periphery side of an end face opposite to the side of the impeller attachment unit 67a. That is, the notches 68b are formed on the inner periphery of the end face and are axially extended from the end face by a predetermined length. In the example illustrated in FIG. 15, there are eight notches 68b. The notch 68b has a tapered shape with a diameter increasing on the end face side compared to the axial center side. The notches 67d of the resin portion 67 (refer to FIG. 11) are formed at the same positions as the four notches 68b arranged substantially at an interval of 90 degrees.

The resin magnet 68 includes a plurality of protrusions 68a, each being, for example, substantially horn shaped and extending axially by a predetermined length substantially at a regular interval in the circumferential direction on an inner periphery side at a predetermined depth from the end face opposite to the side where the notches 68b are formed. In the example illustrated in FIG. 14, there are three protrusions 68a.

As illustrated in FIG. 14, each protrusion 68a has a convex portion 68a-1 that is substantially horn shapes when viewed from the side and protrudes toward the end face. When the rotor unit 60a is molded integrally, the convex portion 68a-1 provided at the end of the protrusion 68a is held by the thermoplastic resin (the resin portion 67) that forms the rotor unit 60a. Accordingly, even if a slight gap is formed between the resin portion 67 and the resin magnet 68 due to resin shrinkage, the rotation torque of the resin magnet 68 can be reliably transmitted, thereby enabling the quality of the rotor unit 60a to be improved. The shape of the protrusion 68a is not limited to being substantially horn shaped, and can be any shape such as a triangle, trapezoid, semicircle, circular arc, or polygon.

The resin magnet 68 includes a plurality of gates 68c on the end face on the side of the magnetic-pole position detection element (the Hall element 58b (see FIG. 4)). Each of the gates 68c is molded into the rotor 60 (see FIG. 15) and each of the gates 68c is supplied with a plastic magnet (a material of the resin magnet 68). Note that the end face on the side of the magnetic-pole position detection element is an end face opposing the magnetic-pole position detection element from among the end faces of the resin magnet 68. The position of the gate 68c is, for example, at a magnetic pole center (see FIG. 15). By having the gate 68c at the magnetic pole center, orientation accuracy of the resin magnet 68 can be improved.

As illustrated in FIG. 13, a hollow portion of the resin magnet 68 has a straight shape from the end face where the protrusions 68a are formed to the substantially center position in the axial direction (the structural center position in the axis direction) and has a drawing-out taper shape from the end face opposite to the end face where the protrusions 68a are formed to the substantially center position in the axial direction. Accordingly, the molded article can be easily taken out from the die, thereby enabling the productivity of the resin magnet 68 to be improved and the production cost to be reduced. That is, because the hollow portion of the resin magnet 68 has a drawn-out taper shape, it can be prevented that a part of or whole of the molded article is stuck to the die and is hard to taken out (adhesion to the die), thereby enabling the productivity of the resin magnet 68 to be improved. The die for molding the resin magnet 68 is divided into a fixed die and a movable die on the end face on the drawn-out taper side of the protrusion 68a. Because a part of the hollow portion formed by the movable die has a straight shape, sticking to the fixed die can be prevented further, and the productivity of the resin magnet 68 can be improved. The resin magnet 68 is pushed out from the movable die by an ejector pin.

As illustrated in FIGS. 13 to 15, a plurality (eight in the example illustrated in FIG. 15) of through holes 69, each extending in the axial direction from the end face on the side of the magnetic-pole position detection element (the Hall element 58b) to the end face on the side of the impeller attachment unit, are formed in the resin magnet 68, each substantially on the same circumference. The through hole 69 is, for example, a circular shape in cross section. The cross-sectional shape of the through hole 69 is not limited to a circular shape, and can be any shape such as a triangle, trapezoid, semicircle, H-shape, crescent, or polygonal shape (not illustrated).

As illustrated in FIGS. 14 and 15, the through holes 69 are respectively formed between the magnetic poles formed in the rotor 60. By forming the through holes 69 between the magnetic poles, the decrease in the magnetic force is reduced as much as possible, and thus a performance decrease of the pump 10 can be reduced.

As illustrated in FIG. 15, a plurality (eight in the example illustrated in FIG. 15) of protrusions 68e, having a substantially elongated hole shape in cross section, are radially formed on the end face opposite to the magnetic-pole position detection element (the Hall element 58b) of the resin magnet 68.

As illustrated in FIG. 15, the protrusions 68e formed on the side of the magnetic-pole position detection element (the Hall element 58b) are formed, for example, substantially at the center of the magnetic poles formed in the rotor 60. That is, the protrusions 68e are arranged corresponding to the positions of the gates 68c, to each of which the material of the resin magnet 68 is supplied. Further, the protrusions 68e, a plurality thereof (for example, eight in the example illustrated in FIG. 15), are formed on the same circumference. By providing the protrusions 68e at the magnetic pole center, the magnetic force is improved and the performance of the pump 10 can be improved.

When the rotor unit 60a is integrally molded from the thermoplastic resin (the resin portion 67), the through holes 69 and the protrusions 68e are embedded in the thermoplastic resin (the resin portion 67), and the resin magnet 68 is held in the resin portion 67.

The resin magnet 68 is provided with a rotor-position detecting magnetic-pole portion 68f, which protrudes axially with a predetermined height in an annular shape having a predetermined width in a radial direction (refer to FIGS. 13, 15, 17 and 19), on an outer periphery of the end face on the magnetic-pole position detection element (the Hall element 58b). In this manner, by causing a part of the resin magnet 68 to protrude toward the magnetic-pole position detection element (the Hall element 58b) as the rotor-position detecting magnetic-pole portion 68f so as to reduce the axial distance between the rotor-position detecting magnetic-pole portion 68f of the resin magnet 68 and the Hall element 58b mounted on the substrate 58, the detection accuracy of the magnetic pole position can be improved.

As the magnetic-pole position detection element, the Hall element 58b being a magnetic sensor is used as the magnetic-pole position detection element, and the Hall element 58b is packaged together with an IC that converts an output signal thereof to a digital signal and is configured as a Hall IC, and the Hall IC is surface-mounted on the substrate 58. By using the Hall IC surface-mounted on the substrate 58 to detect leakage flux of the resin magnet 68 from the axial end face (the surface opposite to the magnetic-pole position detection element) of the resin magnet 68, the machining cost and the like of the substrate 58 can reduce the production cost of the pump 10, as compared to a case where the Hall element 58b is fixed to the substrate 58 by a Hall element holder (not illustrated) so as to detect the main magnetic flux of the resin magnet 68 from the side surface of the resin magnet 68. In contrast, in the conventional arts, in order to detect the magnetic pole position, it has been necessary to assemble the magnetic-pole position detection element on the substrate by using a magnetic-pole position detection-element holder so that the magnetic-pole position detection element (the magnetic sensor) is positioned on an outer periphery of a position detection magnet. Therefore, there have been problems in ensuring an installation space of the magnetic-pole position detection element so as to increase the machining cost due to an increase in the number of components such as the magnetic-pole position detection-element holder.

Although not illustrated, as another modification of the resin magnet 68, the position of the gate 68c, to which the material of the resin magnet 68 is supplied, can be arranged at the magnetic pole center. In this case, the gate 68c can be provided in the protrusion 68e. The resin magnet 68 according to this modification can improve orientation accuracy of the resin magnet 68 by positioning the gate 68c at the magnetic pole center, thereby enabling the quality of the pump 10 to be improved.

Integral molding of the rotor 60 of the pump motor by the thermoplastic resin is described next. The resin magnet 68 is an example of the magnet.

The die for integrally molding the resin magnet 68 and the sleeve bearing 66 includes an upper die and a lower die (not illustrated). The sleeve bearing 66 is first set in the lower die. The sleeve bearing 66 can be set to the die without matching the circumferential direction, because the cross-sectional shape is symmetrical. The sleeve bearing 66 includes a plurality of protrusions 66a (refer to FIG. 12) on the outer periphery thereof, but the position of the protrusions 66a is not specifically limited. Therefore, an operation process is simplified so as to improve the productivity, and the production cost can be reduced.

When the sleeve bearing 66 is set in the lower die, the inner diameter of the sleeve bearing 66 is held in a sleeve-bearing insertion portion (not illustrated) provided in the lower die, thereby ensuring the accuracy of concentricity of the sleeve bearing 66 and the resin magnet 68 to be set in a subsequent process.

After the sleeve bearing 66 is set in the lower die, the resin magnet 68 is set in the lower die by fitting the tapered notches 68b provided on the inner peripheral edge of one of the end faces (the end face opposite to the impeller attachment unit 67a in the state of the rotor 60) to the positioning protrusions (not illustrated) provided in the lower die. In the example illustrated in FIG. 15, there are eight notches 68b. Four notches among these, provided substantially at an interval of 90 degrees, are fitted to the positioning protrusions (not illustrated) in the lower die, thereby ensuring the accuracy of concentricity of the sleeve bearing 66 and the resin magnet 68. The reason why the eight notches 68b are provided is to improve the workability at the time of setting the resin magnet 68 in the lower die.

Further, the magnet pressing parts (not illustrated) provided in the upper die are axially pressed against the substantially horn-shaped protrusions 68a formed on an inner peripheral edge of the other end face (the end face on the side of the impeller attachment unit, and in the state of the rotor 60) of the resin magnet 68. Accordingly, the positioning relation between the sleeve bearing 66 and the resin magnet 68 is secured.

In the example illustrated in FIG. 14, three substantially horn-shaped protrusions 68a are provided on the inner periphery of the resin magnet 68; and a die installation surface (a portion pressed by the die) of the protrusion 68a is exposed after integrally being molded. The reason why there are three protrusions 68a is to secure the positioning accuracy of the resin magnet 68 and ensure a flow passage of the thermoplastic resin to be used for integral molding, thereby alleviating the molding condition at the time of integral molding to improve the productivity.

Even when there is a gap between an insertion portion (not illustrated) of the resin magnet 68 in the lower die and the outer diameter of the resin magnet 68, an inner-diameter pressing part (the positioning protrusion) provided in the lower die ensures the concentricity, and the position relation and the concentricity between the sleeve bearing 66 and the resin magnet 68 can be ensured by sandwiching these by the upper die and the lower die, thereby enabling the quality of the pump 10 to be improved.

In contrast, by making a gap between the insertion portion (not illustrated) of the resin magnet 68 in the lower die and the outer diameter of the resin magnet 68, the workability at the time of setting the resin magnet 68 in the die is improved so as to reduce the production cost.

After the resin magnet 68 and the sleeve bearing 66 are set in the die, the thermoplastic resin such as PPE (polyphenylene ether) is injected into the die, thereby forming the rotor unit 60a. During the injection, the notches 68b (FIG. 15) of the resin magnet 68 that are not pressed by the die, which are the four notches 68 and the protrusions 68e provided on the end face on the side of the magnetic-pole position detection element of the resin magnet 68, are embedded in the resin portion 67 of the thermoplastic resin so as to become a transmitting portion of the rotation torque. Further, through holes 69 and the protrusions 68e are embedded in the resin portion 67 of the thermoplastic resin, thereby firmly holding the resin magnet 68.

After the resin magnet 68 and the sleeve bearing 66 have been integrally molded by using the thermoplastic resin (the resin portion 67), at the time of magnetizing the resin magnet 68, highly accurate magnetization can be performed by using the notches 67d (four notches in FIG. 11) formed on the inner periphery of the one end face in the axial direction of the resin magnet 68 for positioning at the time of magnetization.

Figure 20:
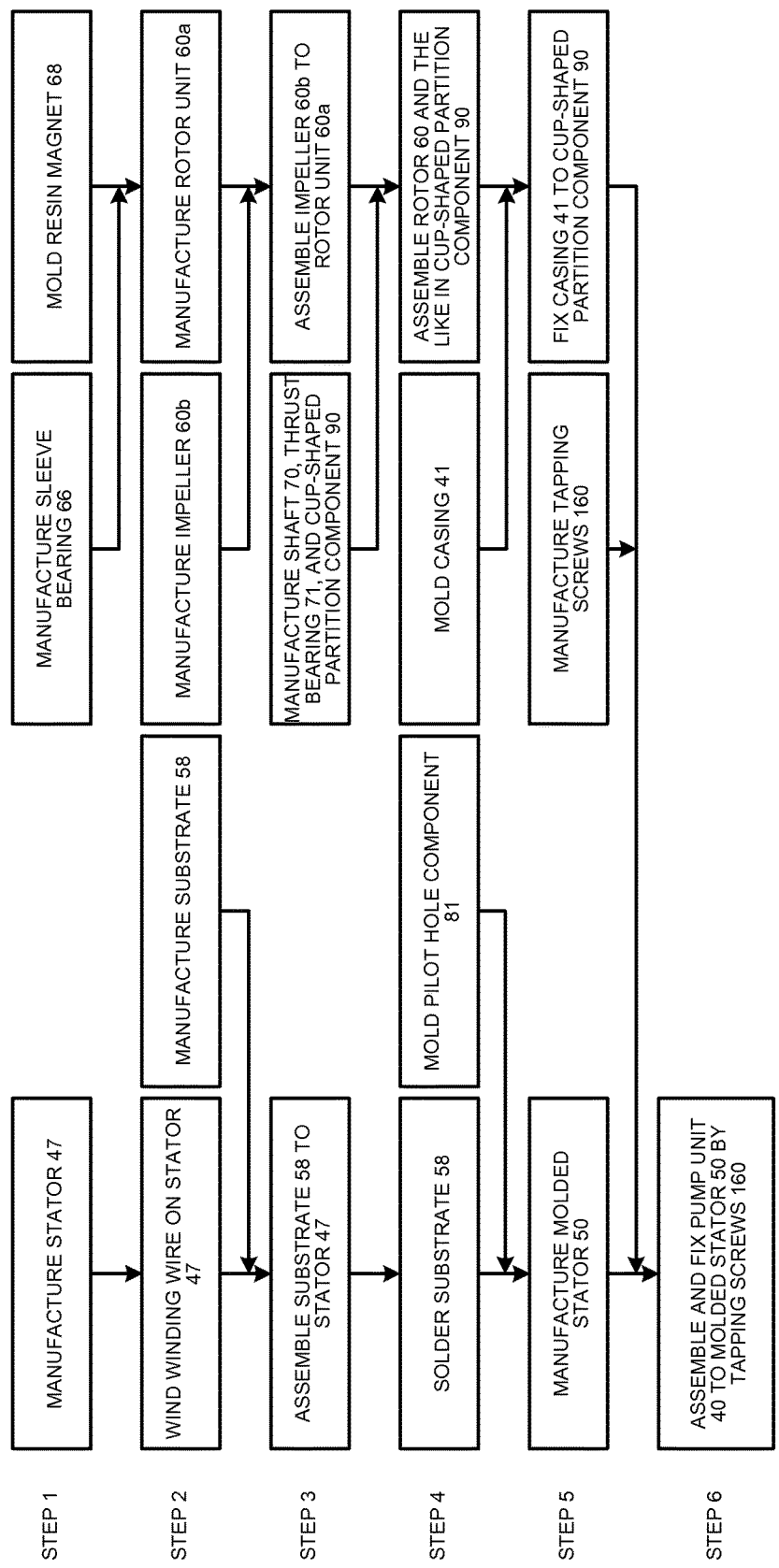
FIG. 20 illustrates a manufacturing process of the pump 10.

The manufacturing process of the pump 10 is described next with reference to FIG. 20. FIG. 20 illustrates the manufacturing process of the pump 10.

(1) Step 1: The annular stator iron core 54 is formed by punching an electromagnetic steel plate having a thickness of about 0.1 millimeter to 0.7 millimeter in a belt-like form and then being laminated by swaging, welding, or bonding. The sleeve bearing 66 is made as well. In addition, the resin magnet 68 having the through holes 69 extending in the axial direction from the end face on the side of the magnetic-pole position detection element (the Hall element 58*b*) to the end face on the side of the impeller attachment unit are molded.

(2) Step 2: The stator iron core 54 is wound with a winding wire. The insulation part 56 using the thermoplastic resin such as PBT (polybutylene terephthalate) is applied to the teeth of the annular stator iron core 54 connected with the thin connection part. The concentratedly wound coil 57 is wound around the teeth applied with the insulation part 56. For example, if 12 (twelve) concentratedly wound coils 57 are connected, three-phase single Y-connection windings are formed. Because the winding is three-phase single Y-connection, the terminals 59 (the supply terminals to which power is supplied and the neutral terminal) of the stator 47, to which the coils 57 of respective phases (a U phase, a V phase, and a W phase) are connected, are assembled on the connection side of the insulation part 56. The substrate 58 is manufactured as well. The substrate 58 is held between the substrate pressing component 95 and the insulation part 56. The IC that drives a motor (for example, a brushless DC motor), the Hall element 58*b* that detects the position of the rotor 60, and the like are mounted on the substrate 58. Further, the substrate 58 is fitted with the lead-wire leading component 61 that leads out the lead wire 52 at the notched portion near the outer periphery thereof. The rotor unit 60*a* is manufactured as well. In the rotor unit 60*a*, the ring-shaped (cylindrical or annular) resin magnet 68 molded by using the pellet formed by kneading a magnetic powder, for example, ferrite powder and resin and the cylindrical sleeve bearing 66 (for example, made of carbon) provided inside of the resin magnet 68 are integrally molded by using the resin such as PPE (polyphenylene ether); and the through hole 69 is embedded in the resin. The impeller 60*b* is also molded. The impeller 60*b* is molded by using the thermoplastic resin such as PPE (polyphenylene ether).

(3) Step 3: The substrate 58 is to be assembled on the stator 47. The substrate 58 fitted with the lead-wire leading component 61 is fixed to the insulation part 56 by the substrate pressing component 95. The impeller 60*b* is also assembled on the rotor unit 60*a* by ultrasonic welding or the like. The cup-shaped partition component 90 is also molded. The shaft 70 and the thrust bearing 71 are manufactured. The shaft 70 is manufactured from, for example, SUS. The thrust bearing 71 is manufactured from, for example, ceramics.

(4) Step 4: The substrate 58 is soldered. The terminals 59 (the supply terminals to which power is supplied and the neutral terminal) are soldered to the substrate 58. The pilot hole component 81 is molded. The casing 41 is also molded. The casing 41 is molded by using a thermoplastic resin such as PPS (polyphenylene sulfide). The rotor 60 and the like are assembled into the cup-shaped partition component 90.

(5) Step 5: After having manufactured the stator assembly 49 by assembling the pilot hole component 81 in the stator 47, the stator assembly 49 is mold-formed so as to manufacture the molded stator 50. The casing 41 is fixed to the cup-shaped partition component 90 to assemble the pump unit 40. The tapping screws 160 are also manufactured.

(6) Step 6: The pump 10 is assembled. The pump unit 40 is assembled on the molded stator 50 and fixed with the tapping screws 160 (refer to FIG. 2).

Figure 21:
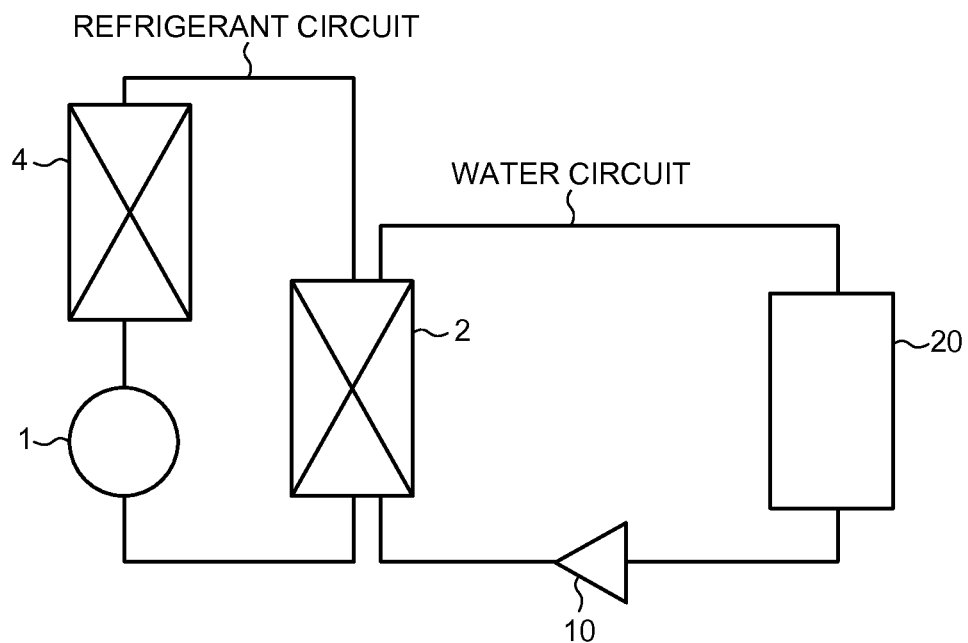
FIG. 21 is a conceptual diagram illustrating a circuit in a refrigeration cycle device that uses a refrigerant-water heat exchanger.

FIG. 21 is a conceptual diagram illustrating a circuit of a refrigeration cycle device using the refrigerant-water heat exchanger 2. The heat-pump type water heater 300 described above is an example of the refrigeration cycle device using the refrigerant-water heat exchanger 2.

The refrigeration cycle device using the refrigerant-water heat exchanger 2 includes, for example, an air conditioner, a floor heating device, or a hot water dispenser. The pump 10 according to the present embodiment constitutes a water circuit of a device using the refrigerant-water heat exchanger 2, and circulates water (hot water) cooled or heated by the refrigerant-water heat exchanger 2 in the water circuit.

The refrigeration cycle device illustrated in FIG. 21 includes the refrigerant circuit having a compressor 1 (for example, a scroll compressor or a rotary compressor) that compresses the refrigerant, the refrigerant-water heat exchanger 2 that performs heat exchange between the refrigerant and water, the evaporator 4 (heat exchanger), and the like. The refrigeration cycle device also includes the water circuit having the pump 10, the refrigerant-water heat exchanger 2, a load 20, and the like.

As described above, according to the present embodiment, the following effects can be achieved.

(1) The resin magnet 68 integrally molded with the sleeve bearing 66 in the rotor unit 60*a* includes the plurality of through holes 69, each extending in the axial direction from the end face on the side of the magnetic-pole position detection element toward the side of the impeller attachment unit and each substantially on the same circumference; these through holes 69 are embedded in the thermoplastic resin when integrally molded from the thermoplastic resin; and the resin magnet 68 is firmly held by the thermoplastic resin. Accordingly, cracking of the magnets due to the thermal shock associated with the cold/hot water cycle can be reduced.

(2) Because the resin magnet 68 is firmly held by the thermoplastic resin without covering the outer peripheral surface of the resin magnet 68 with the thermoplastic resin, the resin magnet 68 and the stator 47 can be arranged close to each other, thereby enabling the performance of the pump 10 to improve.

(3) Because the resin magnet 68 is firmly held by the thermoplastic resin without covering the outer peripheral surface of the resin magnet 68 with the thermoplastic resin, the amount of thermoplastic resin used can be reduced, and the pump 10 can be manufactured at a lower cost.

(4) Because the resin magnet 68 is firmly held by the thermoplastic resin without covering the outer peripheral surface of the resin magnet 68 with the thermoplastic resin, irregularities, which cause an increase of fluid friction losses, are not formed on the outer peripheral surface of the rotor 60, thereby enabling the performance of the pump 10 to improve.

(5) The through holes 69 provided in the resin magnet 68 are positioned between the magnetic poles formed in the rotor 60, so that a decrease of the magnetic force is much reduced and a performance decrease of the pump 10 can be reduced.

(6) The resin magnet 68 is provided with the gates 68*c*, to which the material of the resin magnet 68 is supplied, on the end face opposite to the magnetic-pole position detection element (the Hall element 58*b*); and because the position of the gate 68*c* is at the center of the magnetic pole, the orientation accuracy of the resin magnet 68 can be improved.

(7) The plurality of protrusions 68e are formed, each on the same circumference substantially at a regular interval in the circumferential direction and on the end face opposite to the magnetic-pole position detection element (the Hall element 58b) of the resin magnet 68, and these protrusions 68e are arranged at the center of the magnetic poles. Accordingly, the magnetic force is improved, thereby enabling the performance of the pump 10 to be improved.

(8) The hollow portion of the resin magnet 68 has a straight shape from the end face where the protrusions 68a are formed to the substantially axial center position; and has a drawn-out taper shape from the end face opposite to the end face where the protrusions 68a are formed to the substantially axial center position, thereby enabling the productivity of the resin magnet 68 to be improved.

(9) When the pump 10 is applied to the refrigeration cycle device using the refrigerant-water heat exchanger 2 (for example, an air conditioner, a floor heating device, or a hot water dispenser), the performance and quality of the refrigeration cycle device can be improved and cost can be reduced, due to the improvement of the performance, quality, and the productivity of the pump 10.

Second Embodiment

Figure 22:
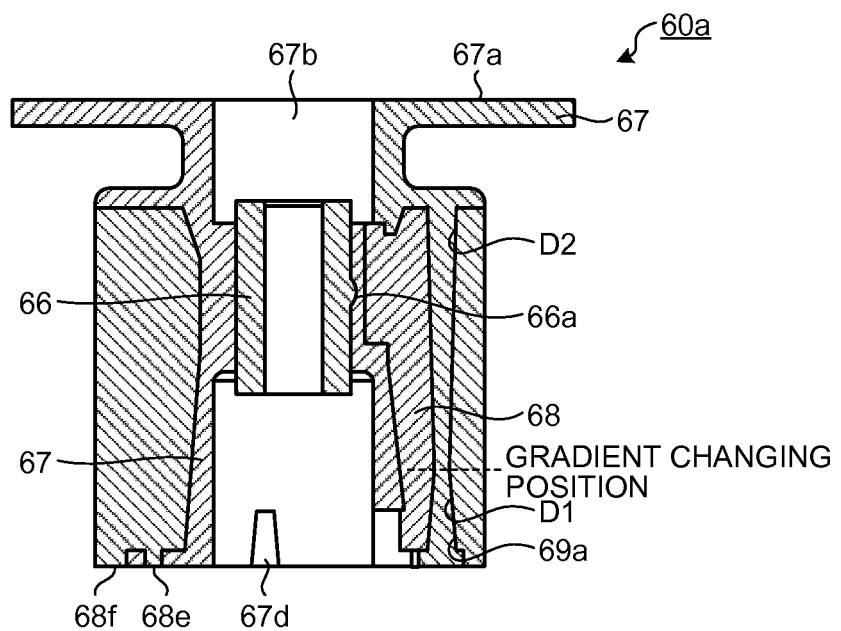
FIG. 22 is a sectional view of the rotor unit 60a according to a second embodiment.
Figure 23:
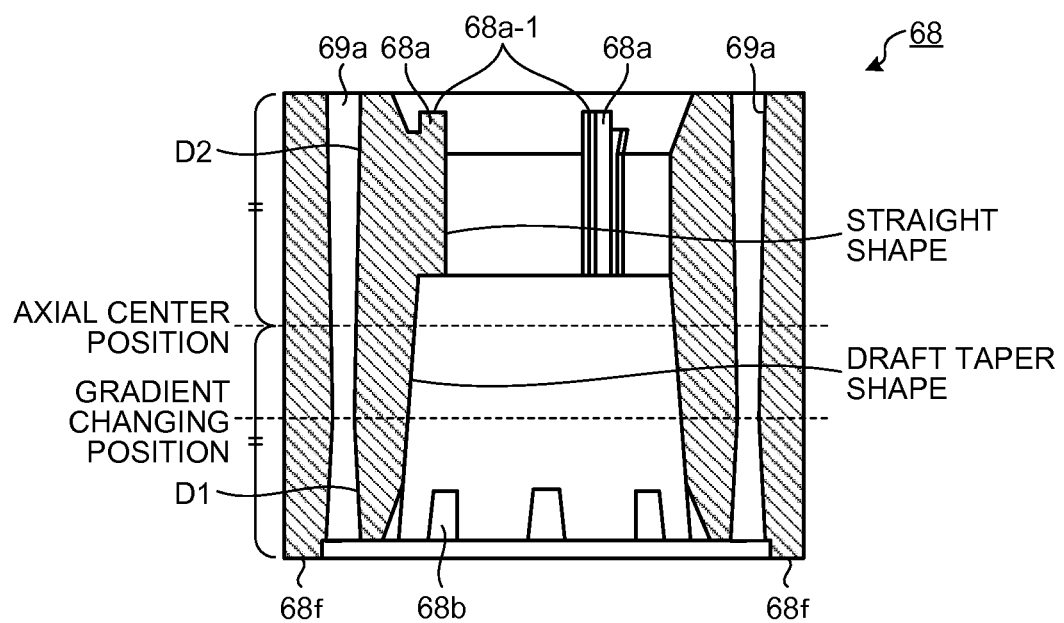
FIG. 23 is a sectional view of the resin magnet 68 according to the second embodiment.

FIG. 22 is a cross-sectional view of the rotor unit 60a according to the present embodiment, which corresponds to FIG. 9 described in the first embodiment. FIG. 23 is a cross-sectional view of the resin magnet 68 according to the present embodiment, which corresponds to FIG. 13 described in the first embodiment. In FIGS. 22 and 23, like reference signs denote like constituent elements in FIGS. 9 and 13. In the present embodiment, the through hole 69 according to the first embodiment is replaced with a through hole 69a having a shape as illustrated in FIGS. 22 and 23. Other configurations are the same as those of the first embodiment.

As illustrated by FIGS. 22 and 23, with a position (gradient changing position) that is a set depth from the end face of the side with the magnetic-pole position detection element (the Hall element 58b) as a reference point, the inner diameter of the through hole 69 slopes, with increasing gradients (diameters) (D1, D2), respectively, from the reference point towards both the magnetic-pole position detection element side and the impellor attachment unit side. That is, the cross-sectional shape of the through hole 69a is such that the external shape of the through hole 69a on the opposite sides has the gradient D1 with respect to the axial direction from the gradient changing position to the end face on the side of the magnetic-pole position detection element so that the inner diameter of the through hole 69a increases toward the side of the magnetic-pole position detection element; and the external shape of the through hole 69a on the opposite sides has the gradient D2 with respect to the axial direction from the gradient changing position to the end face on the side of the impeller attachment unit so that the inner diameter of the through hole 69a increases toward the side of the impeller attachment unit.

Further, by defining a gradient angle and a length of the through hole 69a so that the magnet volume on the side of the magnetic-pole position detection element becomes larger than that on the side of the impeller attachment unit, which is with reference to the center position of the resin magnet 68 in the axial direction (a structure center position in the axial direction), the center of magnetic flux in the axial direction of the resin magnet 68 can be shifted by a predetermined distance toward the side of the magnetic-pole position detection element. By shifting the center positions of the magnetic flux in the axial direction of the rotor 60 and the stator 47 toward the side of the magnetic-pole position detection element, even in a case where the center position of the resin magnet 68 in the axial direction and the center position of the stator 47 in the axial direction are substantially the same, a propulsive force from the side of the magnetic-pole position detection element toward the side of the impeller attachment unit is generated in the rotor 60 so that the center positions of the magnetic flux in the axial direction of the rotor 60 and the stator 47 become substantially the same. Due to such a propulsive force of the rotor 60 pressing the rotor 60 against the casing 41 via the thrust bearing 71, fluctuations in the position in the axial direction of the rotor 60 caused by pressure pulsation of the fluid due to the action of the impeller 60b can be reduced, thereby enabling the quality of the pump 10 to improve.

Instead of providing the gradient in the through hole 69a, by changing the inner diameter of the through hole 69a on the basis of the reference position at the predetermined depth from the end face of the resin magnet 68 on the side of the magnetic-pole position detection element, the center position of the magnetic flux in the axial direction of the resin magnet 68 can be shifted toward the side of the magnetic-pole position detection element by a predetermined distance (not illustrated).

According to the present embodiment, in addition to the effects of (1) to (9) described in the first embodiment, the following effects can be achieved.

(10) The through hole 69a provided in the resin magnet 68 has a gradient by which the inner diameter of the through hole 69a increases both toward the side of the magnetic-pole position detection element and toward the side of the impeller attachment unit, which is with reference to the reference position at the predetermined depth (the gradient changing position) from the end face on the side of the magnetic-pole position detection element (the Hall element 58b). Accordingly, adhesion to the die can be prevented, thereby enabling the productivity of the resin magnet 68 to improve.

(11) By defining the gradient angle and the length of the through hole 69a so that the magnet volume on the side of the magnetic-pole position detection element becomes larger than the magnet volume on the side of the impeller attachment unit, which is with reference to the center position in the axis direction of the resin magnet 68, the center of the magnetic flux in the axial direction of the resin magnet 68 is shifted by the predetermined distance toward the side of the magnetic-pole position detection element. Accordingly, the propulsive force from the side of the magnetic-pole position detection element toward the side of the impeller attachment unit is generated in the rotor 60 to press the rotor 60 against the casing 41 via the thrust bearing 71, thereby enabling the rotor 60 to reduce fluctuations of the position in the axial direction caused by the pulsation of the fluid due to the action of the impeller 60b and enabling the quality of the pump 10 to be improved.

INDUSTRIAL APPLICABILITY

As explained above, the present invention is useful as a pump, a method for manufacturing a pump, and a refrigeration cycle device.

REFERENCE SIGNS LIST

1 compressor, 2 refrigerant-water heat exchanger, 3 decompression device, 4 evaporator, 5 pressure detection device, 6 fan motor, 7 fan, 8 boiling-up temperature detection unit, 9 feed-water temperature detection unit, 10 pump, 11 operating unit, tank-unit control unit, 13 heat-pump-unit control unit, 14 hot water tank, 15 refrigerant pipe, 16 hot-water circulating pipe, 17 ambient-air temperature detection unit, 20 load, 31 bathwater-reheating heat exchanger, 32 bathwater circulating device, 33 mixing valve, 34 in-tank water-temperature detection unit, 35 reheated water-temperature detection unit, 36 mixed water-temperature detection unit, 37 bathwater reheating pipe, 40 pump unit, casing, 42 intake, 43 discharge outlet, 44 boss, 44*a* screw hole, 46 shaft support portion, 47 stator, 49 stator assembly, 50 molded stator, 52 lead wire, 53 mold resin, 54 stator iron core, 54*a* groove, 56 insulation part, 57 coil, 58 substrate, 58*a* IC, 58*b* Hall element, terminal, 60 rotor, 60*a* rotor unit, 60*b* impeller, 61 lead-wire leading component, 63 flat pump-unit installation surface, 66 sleeve bearing, 66*a* protrusion, resin portion, 67*a* impeller attachment unit, 67*b* depression, 67*c* impeller positioning hole, 67*d* notch, 67*e* gate, 68 resin magnet, 68*a* protrusion, 68*a*-1 convex portion, 68*b* notch, 68*c* gate, 68*e* protrusion, 68*f* rotor-position detecting magnetic-pole portion, 69, 69*a* through hole, 70 shaft, 71 thrust bearing, 80 O-ring, pilot hole component, 82 die pressing part, 83 protrusion, 84 pilot hole, 85 leg part, 85*a* protrusion, 87 connection part, 90 cup-shaped partition component, 90*a* cup-shaped partition wall portion, 90*b* flange portion, 90*c* circular O-ring housing groove, 90*d* hole, 92 rib, 94 shaft support portion, 95 substrate pressing component, 95*a* protrusion, 100 heat pump unit, 160 tapping screw, 200 tank unit, 300 heat-pump type water heater

The invention claimed is:

1. A motor rotor comprising:
a rotor unit including a resin portion and an annular magnet; and
the annular magnet including a plurality of through holes, each through hole extending in an axial direction of the annular magnet and being separated from other of the through holes in radial and circumferential directions of the annular magnet,
wherein
the rotor unit is integrally molded from a thermoplastic resin and the annular magnet is held in the resin portion of the integrally molded rotor unit, and the through holes are completely filled with the thermoplastic resin.

2. The motor rotor according to claim 1, wherein
the annular magnet has a first end face and a second end face opposite the first end face in the axial direction of the magnet, the first end face being adapted to oppose a magnetic-pole position detection element provided in a stator, and
an inner diameter of the through holes
increases toward the first end face of the magnet from a gradient changing position that is a reference position at a certain depth from the first end face of the magnet, and
increases from the gradient changing position toward the second end face of the magnet.

3. The motor rotor according to claim 2, wherein
a gradient angle and a length of each of the through holes is defined so that a magnet volume on a first side of the magnet extending from a central position in the axial direction of the magnet to the first end face of the magnet is larger than a magnet volume on a second side of the magnet extending from the central position to the second end face of the magnet.

4. A motor comprising the motor rotor and the stator according to claim 2.

5. A pump comprising the motor according to claim 4.

6. A refrigeration cycle device comprising:
a refrigerant circuit; a water circuit; and a refrigerant-water heat exchanger that exchanges heat between a refrigerant and water by connecting the refrigerant circuit and the water circuit, wherein
the water circuit includes the pump according to claim 5.

7. The motor rotor according to claim 1, wherein
the plurality of through holes are arranged such that each of the through holes is on a same circumference, and
each of the through holes is provided between magnetic poles formed in the motor rotor.

8. The motor rotor according to claim 1, wherein
the annular magnet has an end face facing in the axial direction of the magnet and adapted to oppose a magnetic-pole position detection element provided in a stator,
the magnet is a resin magnet, and
gates, through each of which a material of the resin magnet is supplied to each center of magnetic poles formed in the motor rotor, are provided on the end face of the magnet.

9. The motor rotor according to claim 1, wherein
the annular magnet has an end face facing in the axial direction of the magnet and adapted to oppose a magnetic-pole position detection element provided in a stator, and
the magnet is provided with protrusions on the end face thereof, each of the protrusions being arranged on a same circumference and at a center of each of the magnetic poles formed in the motor rotor.

10. The motor rotor according to claim 1, wherein
the annular magnet has a first end face and a second end face opposite the first end face in the axial direction of the magnet, the first end face being adapted to oppose a magnetic-pole position detection element provided in a stator, and
the annular magnet has a plurality of protrusions provided on an inner periphery surface at a certain depth from the second end face, each of the protrusions having a horn shape in cross section and extending in the axial direction toward the second end face of the magnet.

11. The motor rotor according to claim 1, wherein
the annular magnet has an end face facing in the axial direction of the magnet and adapted to oppose a magnetic-pole position detection element provided in a stator, and
the annular magnet is provided with a plurality of notches formed on an inner peripheral surface of the magnet and opening at the first end face, each of the notches having a substantially horn shape in cross section and disposed substantially at a regular interval in the circumferential direction of the magnet.

12. A motor rotor comprising:
an annular magnet; and
a resin portion formed from a thermoplastic resin from which is made an integral molding for a rotor unit including the magnet, wherein
the magnet includes a plurality of through holes that each extend in an axial direction,
each of the through holes is embedded in the thermoplastic resin, one end face is in the axial direction of the magnet and opposes a magnetic-pole position detection element provided in a stator, the magnet is a resin magnet, and gates, through each of which a material of the resin magnet is supplied to each center of magnetic poles formed in the motor rotor, are provided on an end face on a side of the magnetic-pole position detection element of the magnet.

13. A motor rotor comprising:

an annular magnet; and a resin portion formed from a thermoplastic resin from which is made an integral molding for a rotor unit including the magnet, wherein the magnet includes a plurality of through holes that each extend in an axial direction, each of the through holes is embedded in the thermoplastic resin, one end face is in the axial direction of the magnet and opposes a magnetic-pole position detection element provided in a stator, and the magnet is provided with protrusions, each of which is arranged on a same circumference and at a center of each of the magnetic poles formed in the motor rotor, on an end face on a side of the magnetic-pole position detection element.

* * * * *